Sept. 20, 1971 R. W. LOESCH 3,605,928
SYSTEM FOR MAINTAINING LATERALLY SPACED
VEHICLES LONGITUDINALLY ABREAST
Filed Sept. 29, 1969 5 Sheets-Sheet 1

INVENTOR
RAYMOND W. LOESCH

BY
*Dunlap, Laney, Hessin & Dougherty*
ATTORNEYS

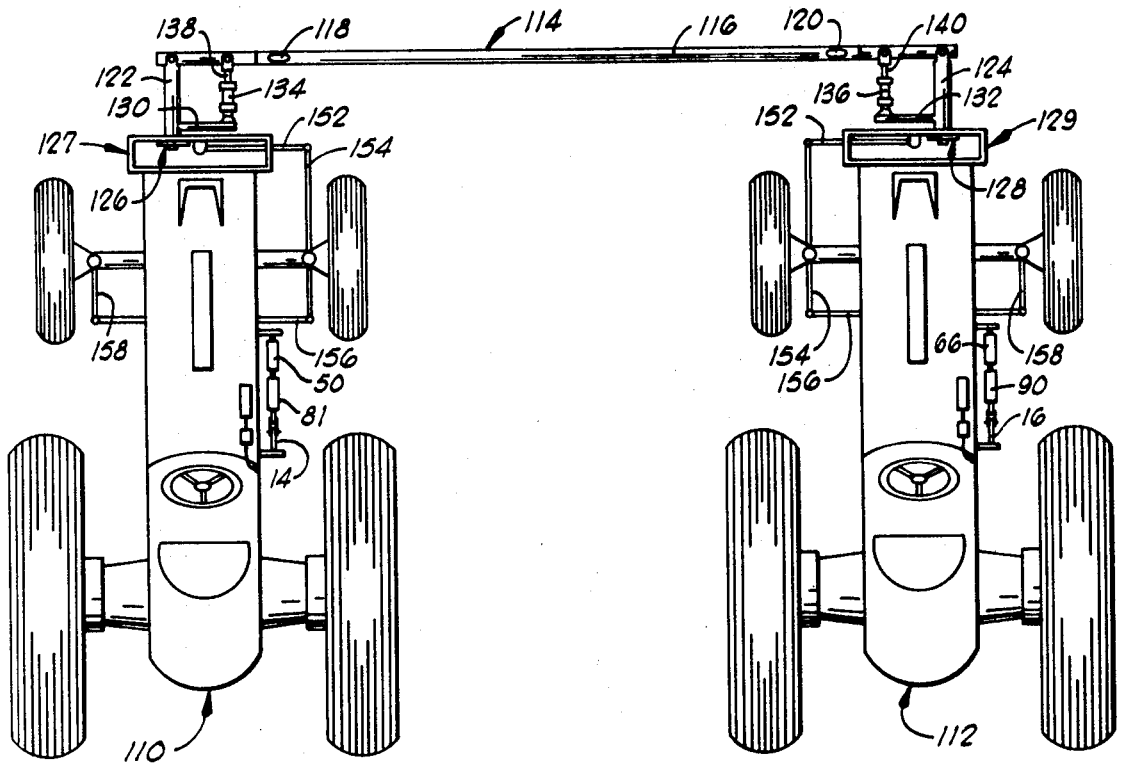
Fig. 2
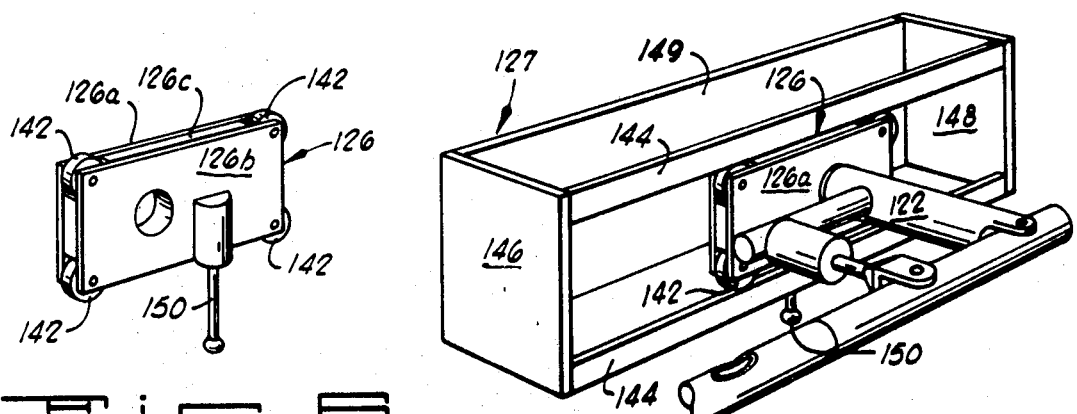
Fig. 3
Fig. 4

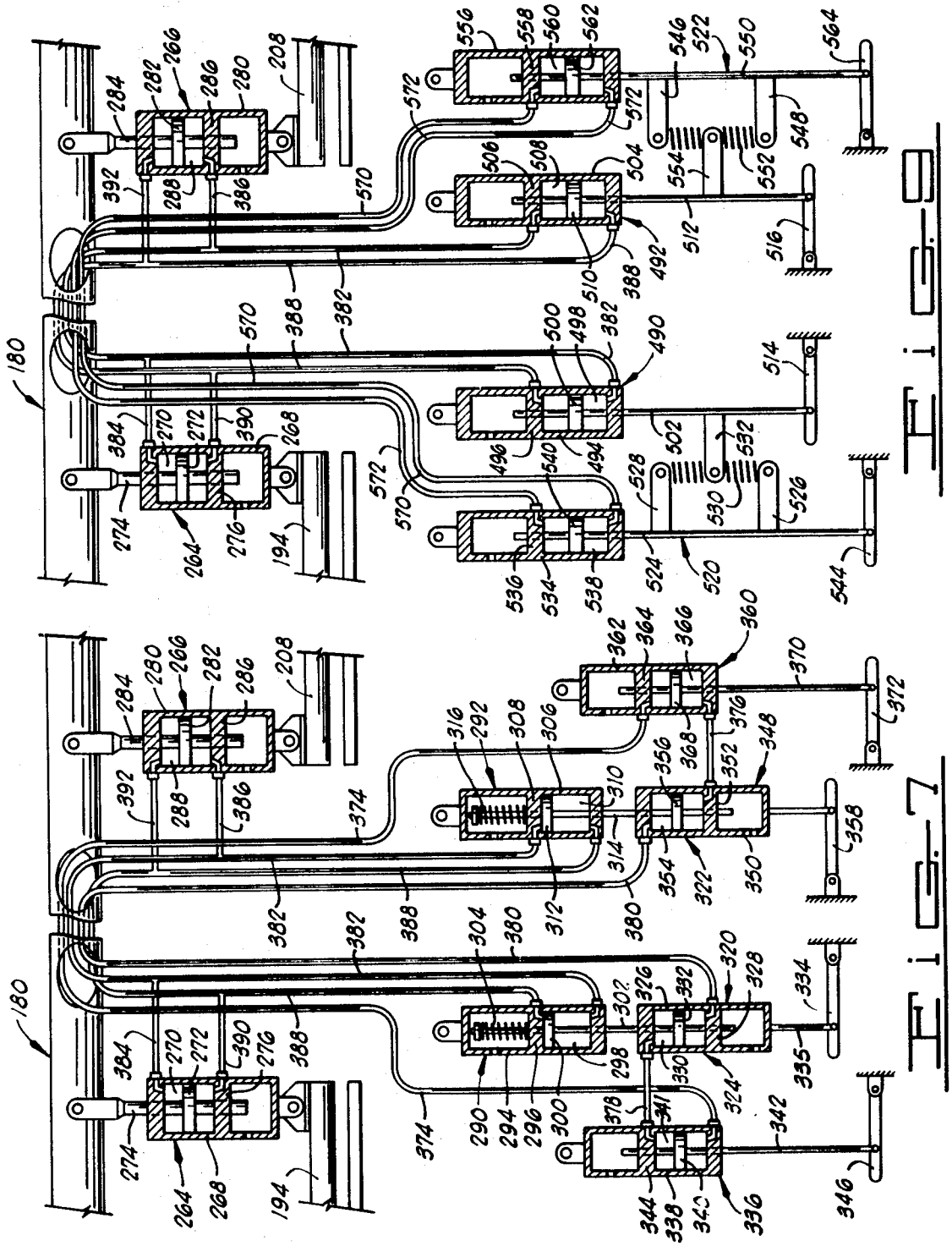

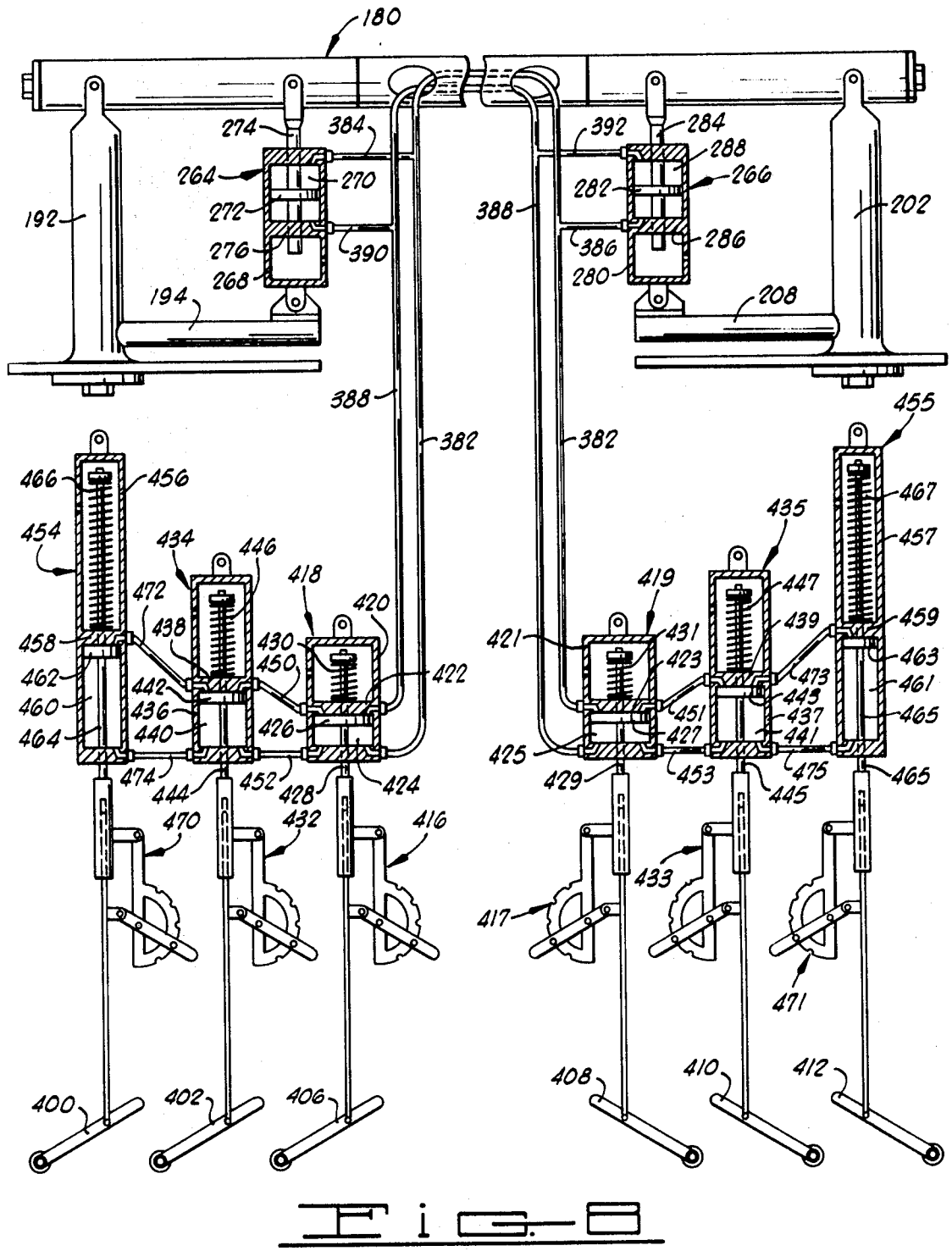

United States Patent Office 3,605,928
Patented Sept. 20, 1971

3,605,928
SYSTEM FOR MAINTAINING LATERALLY SPACED VEHICLES LONGITUDINALLY ABREAST
Raymond W. Loesch, 1601 E. Oklahoma St.,
Enid, Okla. 73701
Filed Sept. 29, 1969, Ser. No. 861,868
Int. Cl. B60d 7/00
U.S. Cl. 180—14                          20 Claims

ABSTRACT OF THE DISCLOSURE

A system for simultaneously operating a plurality of vehicles from one of the vehicles to automatically maintain them in horizontal alignment abreast of each other, which system includes a linkage interconnecting the steering mechanisms of the vehicles to produce identical turning movement in the vehicles, and a closed hydraulic-mechanical system which is connected to speed control devices on the several vehicles so that any vehicle which advances beyond other vehicles in the array will actuate a hydraulic signal which is used to change the relative speeds of the vehicles to restore horizontal alignment of the several vehicles.

BACKGROUND OF THE INVENTION

Field of the invention

This invention relates to automatic control systems useful for automatically synchronizing the movements of a plurality of self-propelled vehicles. More specifically, the invention relates to a system for automatically maintaining a plurality of self-propelled vehicles abreast and in horizontal alignment, both during linear travel, and during a turning movement.

Brief description of the prior art

In agriculture particularly, and also frequently in other fields, it is recognized that it is often desirable to allow a single operator to control as much earth-working or other powered, mobile equipment as possible in order to reduce labor costs. Efforts to achieve this end in agricultural operations have been manifested by the provision of more powerful engines for farm tractors, the development of tandem and serial hookups to permit more towed implements to be towed behind a single tractor in a manner to cover more ground area, and more recently, hydraulic control systems for automatically maintaining a desired relationship of one tractor relative to another during concurrent movement of both.

One such hydraulic control system is shown in Steepe U.S. Pat. 3,035,653 issued May 22, 1962. In the Steepe system, a leading and trailing tractor are maintained in a tandem relationship by means of an assembly which includes a telescoping draw bar connection which, in undergoing extensions and reductions in length, actuates a hydraulic cylinder. The hydraulic cylinder transmits hydraulic signals to slave cylinders and pistons located on the trailing tractor and controlling the throttle and clutch of the trailing tractor.

Another tandem tractor arrangement is shown in Peterson U.S. Pat. 3,245,488, and Prinoth U.S. Pat. 3,368,292 there is described and illustrated a system for connecting two vehicles abreast and in horizontal alignment for operation of both from a single control point on one vehicle.

BRIEF DESCRIPTION OF THE PRESENT INVENTION

The present invention provides a system for maintaining two self-powered vehicles abreast of each other, laterally spaced and in horizontal alignment. The system may be broadly described as comprising means interconnecting the steering assemblies of the two vehicles so that the vehicles are substantially identically steered during operation, and a closed hydraulic system connected between the speed control mechanisms of the vehicles and responsive to changes in the relative positions of the vehicles to change the speed of one or more vehicles as required to restore the vehicles to the position in which they are abreast in substantially horizontal alignment.

More specifically, the means interconnecting the steering assemblies of the vehicles comprises a linkage which connects the steering wheels of the several vehicles to each other to cause the wheels of all other vehicles to respond to a turning movement imparted to the steering wheels of one of the vehicles. The closed hydraulic system comprises a master piston and cylinder subassembly mounted on each vehicle and a mechanical actuating linkage pivotally connected between the vehicles, and connected to the piston rod of each of the master piston and cylinder subassemblies so that the piston of each of said subassemblies is moved in its respective cylinder in response to a change in the angulation of said actuating linkage with respect to the fore-and-aft (longitudinal) axis of the vehicle on which the respective master piston and cylinder subassembly is mounted. The closed hydraulic system further includes a slave piston and cylinder subassembly mounted on each vehicle and hydraulically interconnected to the several master piston and cylinder assemblies in a closed hydraulic circuit. The piston rod of each slave piston and cylinder subassembly is mechanically connected to a speed control device forming a part of the controls of each vehicle.

An important object of my invention is to provide a system whereby a plurality of vehicles may be automatically maintained in their positions relative to each other such that they are retained substantially longitudinally abreast and laterally separated, and so that by the use of a suitable steering assembly interconnecting the vehicles, they may be concurrently utilized by a single operator.

Another object of the invention is to provide a system for maintaining a plurality of self-propelled vehicles abreast so that a single operator may benefit by the distribution of a greater amount of power over a wider area, thus reducing the manpower normally required for the operation of an equivalent number of vehicles.

Another object of the invention is to permit a plurality of self-propelled vehicles to be maintained abreast while moving in a straight line or turning so that a single operator may accomplish a given amount of work in a substantially lesser time than would such operator in instances where it is necessary to operate but a single vehicle.

An additional object of the invention is to provide for the horizontal or lateral alignment of self-propelled vehicles which are operated by a driver of a single one of the vehicles so that such driver is afforded a clear and unobstructed view of earth-working equipment which may be towed behind both vehicles, and so that the vehicles on one or both sides of the driver-operated vehicle can be clearly viewed at all times by the driver.

A further object of the invention is to provide a system for automatically controlling movements of a plurality of self-propelled vehicles in such a way that the relative positions of the vehicles can be maintained in a preselected status without substantial variation from such preselected status, which system is characterized in having a relatively long and trouble-free operating life, and is relatively easily maintained.

Additional objects and advantages of the invention will become apparent as the following detailed description of the invention is read in conjunction with the accompanying drawings.

BRIEF DESCRIPTION OF THE DRAWINGS

FIG. 2 is a top plan view of a pair of farm tractor vehicles illustrating these vehicles as they are interconnected by a steering assembly and by a portion of the closed hydraulic-mechanical system forming a portion of the invention.

FIG. 4 is an enlarged detail perspective view of a portion of the mechanical linkage utilized to interconnect the two tractors in the embodiment of the invention illustrated in FIG. 2.

FIG. 5 is an enlarged detail perspective view of a portion of the mechanical subassembly illustrated in FIG. 4.

FIG. 7 is a diagrammatic illustration of a hydraulic system utilized in a modified embodiment of the invention.

FIG. 8 is a diagrammatic illustration of a hydraulic system utilized in another embodiment of the invention.

FIG. 9 is a diagrammatic illustration of a hydraulic system and associated mechanical linkages employed in yet another embodiment of my invention.

DETAILED DESCRIPTION OF PREFERRED EMBODIMENTS OF THE INVENTION

Figure 1:
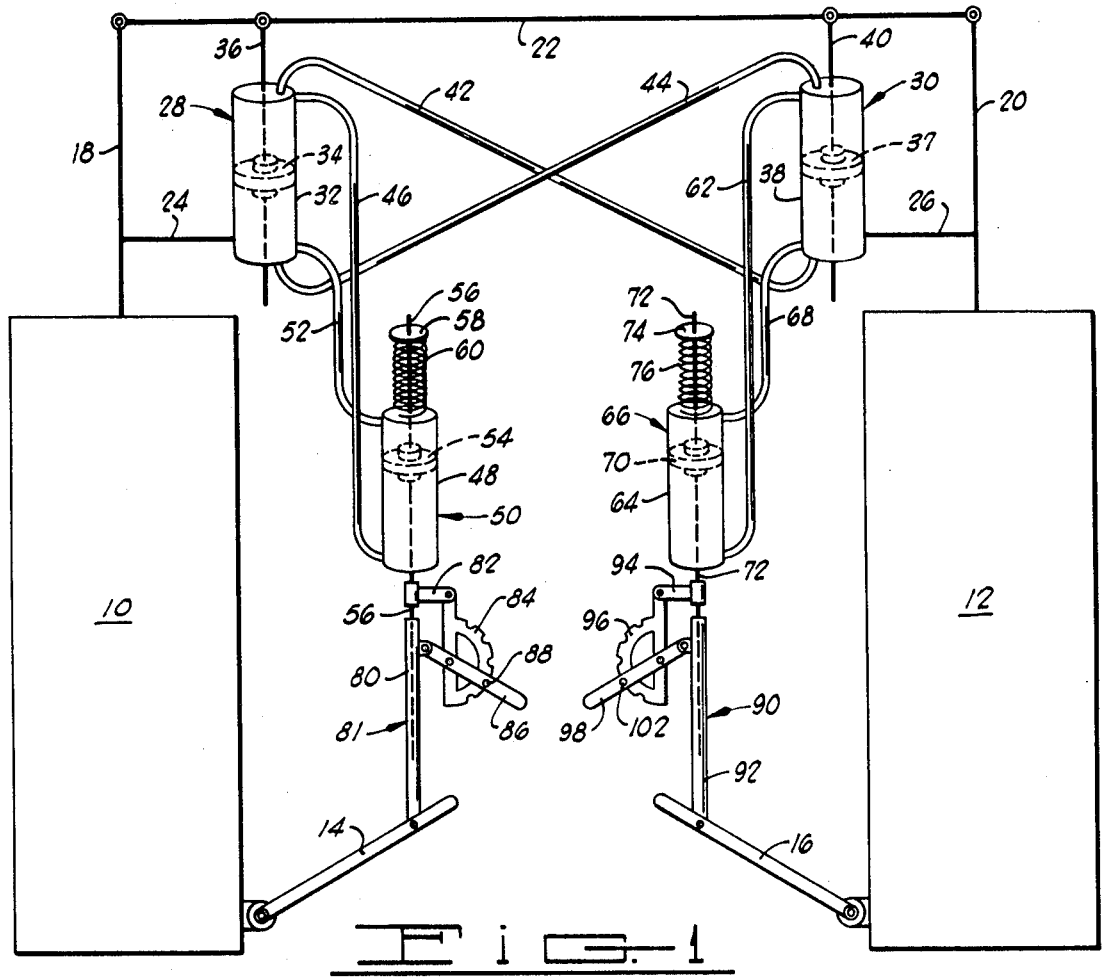
FIG. 1 is a schematic illustration of the closed hydraulic-mechanical system forming a portion of the present invention and utilized for maintaining a plurality of vehicles abreast during forward and turning movements.

The principles which underlie and dictate the effective action of my automatic control system may best be understood by referring initially to the schematic illustration presented in FIG. 1. In this view, a pair of self-propelled vehicles, such as agricultural tractors, are schematically depicted by rectangular boxes, and are indicated by reference numerals 10 and 12. It will be noted that the vehicles are shown as traveling abreast in horizontal alignment on substantially parallel courses. The vehicles are each provided with speed control devices which, in the illustrated embodiment, constitute a pair of throttle levers 14 and 16 on the vehicles 10 and 12, respectively. For purposes of discussion, let it be assumed that the speed of the vehicle 10 will be increased when the throttle lever 14 is moved toward the forward end of the vehicle, that is, toward the top of the page of the drawings, and will be decreased when the throttle lever is pivoted toward the rear end of the vehicle, that is, toward the lower portion of the drawings. Similar movements of the throttle lever 16 control the forward motion of the vehicle 12 so that, as this throttle lever is pivoted forwardly, the speed of the vehicle is increased and a rearward pivotal movement of the throttle lever 16 decreases the speed of this vehicle.

Mounted on the front or forward portion of the vehicle 10 is a rigid, forwardly projecting mounting member 18. The mounting member 18 extends in substantial parallelism with the course or heading of the vehicle 10, and has an outer end disposed forwardly of the forward end of the vehicle 10. Similarly, a rigid mounting member 20 is mounted on the front end or forward portion of the vehicle 12 and extends in substantial parallelism to the heading or course followed by the vehicle 12. Extending between the outer ends of the rigid mounting members 18 and 20 and pivotally connected thereto is a transverse linking member 22. The member 22 is rigid in a transverse sense, but may or may not be made telescoping in a longitudinal (axial) line, as will be hereinafter explained. In other words, the linking member 22, while pivotally connected to the rigid mounting members 18 and 20 at its opposite ends, is not articulated intermediate its length and thus forms a non-bending connection between the rigid mounting members 18 and 20.

Extending transversely and substantially normal to an intermediate portion of the rigid mounting member 18 is a mounting arm 24. It will be noted that the mounting arm 24 extends from the rigid mounting member 18 toward, or in the general direction of, the vehicle 12. Similarly, a rigid mounting arm 26 is rigidly secured to the mounting member 20 and extends normal thereto, and in a direction therefrom toward the vehicle 10. As will become apparent from the following description, the rigid mounting arms 24 and 26 could also be made to extend outwardly (away from the other vehicle), if this should be desirable. The rigid mounting members 24 and 26 each have pivotally supported thereon at their outer ends, master piston and cylinder subassemblies designated generally by reference numerals 28 and 30, respectively.

The master piston and cylinder subassembly 28 includes a cylinder 32 which contains a piston 34 mounted on an intermediate portion of an elongated piston rod 36. It will be noted that the piston rod 36 has an enlarged diameter portion immediately adjacent the piston 34 and on opposite sides thereof so that the movement of the piston 34 in the cylinder 32 will be arrested by contact of the enlarged diameter portion of the piston rod with the closed ends of the cylinder 32 at a time prior to the time when the piston 34 travels completely to either end of the cylinder. This effects the maintenance of a space between the piston 34 and each end of the cylinder 32 at all points of travel of the piston within the cylinder.

The master piston and cylinder subassembly 30 is constructed similarly to the master piston and cylinder subassembly 28 and thus includes a piston 37 which is slidably mounted in a cylinder 38, and is keyed or secured to an elongated piston rod 40 which slidingly projects through the opposite ends of the cylinder 38. The piston rod 40 has an enlarged portion projecting for a short distance on opposite sides of the piston 37 to limit the movement of the piston within the cylinder 38 as described in referring to the subassembly 28. The piston rods 36 and 40 each have one end pivotally connected to the transverse linking member 22.

A hydraulic conduit 42 extends from the forward end of the cylinder 32 forming a portion of the subassembly 28 to the rear end of the cylinder 38 forming a portion of the subassembly 30. The hydraulic conduit 44 extends from the forward end of the cylinder 38 to the rear end of the cylinder 32. Also extending from the forward end of the cylinder 32 forming a portion of the subassembly 28 is a conduit 46. The conduit 46 is connected to the rear end portion of a cylinder 48 forming a part of a slave piston and cylinder assembly designated generally by reference numeral 50. A conduit 52 extends from the rear portion of the cylinder 32 forming a portion of the subassembly 28 to the forward portion of the cylinder 48 forming a portion of the slave piston and cylinder subassembly 50. Thus, the conduit 46 places the interior of the forward end of the cylinder 32 in communication with the interior of the rear end of the cylinder 48, and the conduit 52 places the interior of the rear end of the cylinder 32 in communication with the interior of the forward end of the cylinder 48.

The slave piston and cylinder assembly 50 includes, in addition to the cylinder 48, a piston 54 which is slidably mounted within the cylinder, and is keyed to an elongated piston rod 56 which is slidingly extended through the opposite ends of the cylinder 48. The piston rod 56 carries a stop plate 58 adjacent its forward end, and the stop plate 58 is engaged by one end of an extension spring 60 which is extended between the forward end of the cylinder 48 and the stop plate. The extension spring 60 functions to bias the piston rod 56 forwardly, and thus to exert a constant bias upon the piston 54 tending to move the piston toward the end of the cylinder 48 with which the conduit 52 communicates. It will be noted that the piston rod 56 has an enlarged diameter portion which projects on opposite ends of the piston 54, and functions to limit the movement of the piston within the cylinder 48 to preserve a space between the piston and the opposite ends of the cylinder when the piston has reached its limit of travel.

Extending from the forward end portion of the cylinder 38 forming a part of the master piston and cylinder subassembly 30 is a hydraulic conduit 62 which is connected to the rear end portion of a cylinder 64 forming a portion of a slave piston and cylinder subassembly designated generally by reference numeral 66. A conduit 68 extends from the rear portion of the cylinder 38 to the forward portion of the cylinder 64. Positioned within the cylinder 64 is a piston 70 which is secured to a central portion of an elongated piston rod 72. The piston rod 72 extends slidingly through opposite ends of the cylinder 64 and has secured adjacent the forward end thereof, a spring stop plate 74. The spring stop plate 74 forms an abutment against which one end of an extension spring 76 abuts. The other end of the extension spring 76 abuts the outer end of the cylinder 64 so as to bias the piston rod 72 and the piston 70 which it carries forwardly within the cylinder 64. It will be noted that the piston rod 72 is of an enlarged diameter adjacent, and on opposite sides of, the piston 70 so that the movement of the piston 70 within the cylinder 64 is limited in the manner hereinbefore described.

The opposite end portion of the piston rod 56 from that end which carries the spring abutment plate 58 is slidingly telescoped in a sleeve 80 forming a part of an interlink control subassembly 81. The portion of the piston rod 56 between the sleeve 80 and the cylinder 48 has secured thereto an arm 82 which is pivotally connected to a notched, arcuate indexing member 84. There is also pivotally secured to the portion of the indexing member 84 which extends substantially parallel to the piston rod 56, an interlink control lever 86. The interlink control lever 86 carries a stud or protuberant pin 88 which can be set into one of the notches in the arcuate indexing member 84.

A similar interlink control subassembly 90 is provided for interconnecting the piston rod 72 with the throttle lever 16. The interlink control subassembly 90 includes a sleeve 92 which is pivotally connected at one end to the throttle lever 16 and which is telescoped over the end of the piston rod 72 opposite its end which carries the spring stop plate 74. An arm 94 is keyed to the piston rod 72 at a location between the sleeve 92 and the cylinder 64, and pivotally engages a notched, arcuate indexing member 96. An interlink control lever 98 is pivotally secured to the portion of the indexing member 96 which extends substantially parallel to the piston rod 72, and is also pivotally secured to the outer periphery of the sleeve 92. A suitable pin or stud 102 is carried by the interlink control lever 98 for engagement with one of the notches in the arcuate member 96 for the performance of a function hereinafter explained.

Certain basic principles of the invention can be best understood by a description of the manner in which the closed hydraulic-mechanical system depicted in FIG. 1 operates to control relative movement of the self-propelled vehicles 10 and 12. It will be noted in referring to this figure that the movements of the piston rods 56 and 72 control the movement of the throttle levers 14 and 16, respectively, subject to a certain amount of further adjustability which is permitted by the variable interlink controls 81 and 90 as hereinafter more fully described. Thus, assuming no variation in the position of the piston rods 56 and 72 with respect to the sleeves 80 and 92 which they enter, any movement of these rods in the opposition direction from that which the rods tend to be biased by the respective spring 60 or 76 will move the respective throttle lever 14 or 16 rearwardly, and thus cause a decrease in the speed of the respective vehicle 10 or 12 as hereinbefore described. It may be pointed out here that the slave piston and cylinder subassemblies 50 and 66 are mounted in some suitable location on the respective self-propelled vehicles 10 and 12, and thus move with these vehicles and are maintained (except for the piston rods thereof) in substantially the same spatial relationship at all times with respect to the point of pivotal connection of the speed control levers 14 and 16 to their respective vehicles. The hydraulic cylinders 32, 38, 48 and 64 and the several conduits which interconnect these cylinders are filled with a suitable liquid which is, of course, substantially incompressible.

In considering the operation of the systems schematically depicted in FIG. 1, let it be assumed that the vehicles 10 and 12 are headed toward the top of the page so that the rigid mounting members 18 and 20 extend directly forward from each of the respective vehicles in the direction of forward travel of vehicles. Assuming first that the horizontal attitude or heading of the self-propelled vehicle 10 is altered so that a forward portion of the vehicle swings or moves to the right by an arbitrary amount, and that the heading of the self-propelled vehicle 12 is altered so that the forward portion of this vehicle swings toward the left, the rigid mounting members 18 and 20 will accordingly be swung toward each other as the member 18 swings toward the right and member 20 swings toward the left. For the purpose of this discussion, it may be assumed that the described movements of the vehicles 10 and 12 are permitted not only by the pivotal connections of the members 18 and 20 to the transverse linking member 22, but also by an ability of the transverse member 22 to be foreshortened or telescoped along its longitudinal axis. A structure for allowing this telescoping movement will be hereinafter described.

If the changes from the directly forward heading toward the right and left, respectively, of the vehicles 10 and 12 are identical changes, it will be seen that the angles defined by the rigid mounting members 18 and 20 with the transverse linking member 22 shall become greater by an equal amount which is directly related to the amount by which the vehicles are swung away from their forward headings as depicted. The increase in the angle between the rigid mounting members 18 and 20 and the transverse linking member 22 results in an extension of the piston rods 36 and 40 from their respective cylinders 32 and 38 by an equal distance. This occurs because the cylinders 32 and 38 are pivotally secured to the mounting arms 24 and 26 which are in turn retained at a constant angle relative to the mounting members 18 and 20.

The forward extension of the piston rods 36 and 40 results in a movement of the pistons 34 and 37 contained within the cylinders 32 and 38, respectively, toward the forward ends of these cylinders. Stated differently, the pistons 34 and 37 move toward the ends of the cylinders 32 and 38 to which the conduits 46 and 62, respectively, are connected. The extent to which the pistons 34 and 37 move in the direction described within their respective cylinders will be substantially equal due to the equal extension of the piston rods 36 and 40.

As the pistons 34 and 37 move within the cylinders 32 and 38 in the manner described, the liquid within the cylinders can pass through the conduits 42 and 44 so that the liquid exactly occupies the increase in the volumes of the portions of the cylinders 32 and 38 into which the displaced liquid is directed. Little or none of the liquid which must be passed from the cylinders 32 and 38 as a result of the forward movement of pistons 34 and 37 can enter the rear end of the cylinders 48 and 64, since at this time, the pistons 54 and 70 contained within these cylinders cannot be displaced forwardly, having already been biased to the limit of their forward travel by the springs 60 and 76 respectively, which are associated with, and act upon, their respective piston rods 56 and 72. Since the pistons 54 and 70 are not moved at this time, there is therefore no change in the forward speed of either of the vehicles 10 or 12, since the throttle levers 14 and 16 also remain stationary.

Next, let it be assumed that the heading of the vehicle 10 is altered to the left by an arbitrary degree from an initial heading in the direction depicted in FIG. 1. Assume that the vehicle 12 is altered to the right in its heading to a degree which corresponds to the change of heading to the left of vehicle 10. As a result of these identical changes in the headings of the vehicles 10 and 12, the angles which are defined between the transverse linking member 22 and the rigid mounting members 18 and 20 are decreased by a substantially identical amounts. This will result in the piston rods 36 and 40 being driven into the cylinders 32 and 38, respectively, by an identical amount so that hydraulic fluid is forced from the rear portion of each of these cylinders. Identical movement of the piston rods 36 and 40 into the cylinders 32 and 38 results in the respective pistons 34 and 37 also being moved rearwardly in these cylinders by an equal amount, so that the ejected hydraulic fluid moves through the conduits 42 and 44 in the closed system to fill the volume behind the pistons as they enlarge the space between themselves and the closed forward ends of their respective cylinders. No fluid will, at this time, move from the cylinder 32 to the cylinder 48 of the slave piston and cylinder subassembly 50, and neither will any hydraulic fluid move from the cylinder 38 to the cylinder 64 of the slave piston and cylinder assembly 66. Therefore, there will be no force applied to either of the throttle levers 14 and 16 to change the speed of either of the vehicles 10 and 12.

If it is now assumed that the self-propelled vehicle 10 is turned toward the left away from the self-propelled vehicle 12 while the latter vehicle maintains its illustrated heading, the result will be that the angle defined by the rigid mounting member 18 with respect to the transverse linking member 22 will become smaller. Therefore, the piston rod 36 will be moved rearwardly with respect to the vehicle 10. This will cause the piston 34 connected to the piston rod 36 to move rearwardly in the cylinder 32, thus increasing the volume within the cylinder 32 ahead of the piston 34, and decreasing the volume to the rear of piston 34 within the cylinder 32. The hydraulic fluid forced from the cylinder 32 may pass most easily through the conduit 52 and into the space within the cylinder 48 which is forward of the piston 54. The piston 54 can be displaced rearwardly since, at this time, the volume forward of the piston 34 within the cylinder 32 is increasing, creating a demand in that space for hydraulic fluid which can be delivered to the space from the rear end of cylinder 48 through the conduit 46. Thus, as hydraulic fluid from the conduit 52 enters the forward end of the cylinder 48, the piston 54 contained therein is forced rearwardly, dispelling hydraulic fluid from this cylinder through the conduit 46 into the forward end of the cylinder 32. With the displacement of the piston 54 to the rear against the bias of the spring 60, if the piston rod 56 is at this time fixed in its relationship to the sleeve 80 through the interlink variation means 81, the throttle lever 14 will be moved rearwardly to decrease the speed of the vehicle 10.

It should be pointed out at this time that since the self-propelled vehicle 12 is maintained on the same heading, there is no change in the angle between the linking member 22 and the rigid mounting member 20, and the piston rod 40 thus does not change its position relative to the cylinder 38. Thus, the spaces on opposite sides of the piston 37 within the cylinder 38 remain filled with hydraulic fluid, and the fluid ejected from the cylinder 32 by the rearward movement of the piston 34 therein does not pass through the conduit 44 into the forward end of the cylinder 38. Moreover, a tendency of the liquid to pass onward through the cylinder 38 and conduit 62 into the cylinder 64 is resisted by the filled status of the cylinder 64 forming a part of the slave piston and cylinder subassembly 66. No change in the position of the piston 70 within the cylinder 64 can occur, and therefore the throttle lever 16 remains stationary and no change in the speed of the vehicle 10 occurs.

Without going into repetitive detail, it is believed that it will be apparent from the foregoing discussion of the response of the system of the present invention to a turning to the left of the vehicle 10 while the vehicle 12 is maintained on course, that an opposite response will occur when the vehicle 12 is turned to the right and the vehicle 10 is maintained on course. Thus, in such a situation, the closed hydraulic-mechanical system will resopnd to move the pistons 70 toward the rear within the cylinder 64 of the slave piston and cylinder subassembly 66, resulting in a corresponding rearward movement of the throttle lever 16, provided a rigid connection is, at this time, formed between the sleeve 92 and the piston rod 72. The forward speed of the vehicle 12 will therefore be decreased. Since no change in the heading of the vehicle 10 has occurred, the vehicle 10 will continue at substantially the same speed.

If, instead of turning to the left, the vehicle 10 should turn from its illustrated heading toward the right, the result will be an enlargement of the angle between the mounting member 18 and the transverse linking member 22. Enlargement of this angle will extend the piston rod 36 from the cylinder 32 in a forward direction, thus causing the piston 34 to move forwardly within this cylinder. Assuming that the vehicle 12 remains on the illustrated heading, the piston 37 in the cylinder 38 does not move. Also, since the piston 54 in the cylinder 48 is at its limit of forward travel due to the bias of the spring 60, it is not possible to force fluid from the forward end of the cylinder 32 through the conduit 46 into the rear end of the piston 48. Accordingly, fluid is ejected from the forward end of the cylinder 32 into the conduit 42. The piston 37 cannot move forward, however, at this time since there has been no change in the angular relationship of the transverse linking member 22 with respect to the mounting member 20. Therefore, the hydraulic fluid from the conduit 42 is passed on through the conduit 68 to the upper end of the cylinder 64 of the slave piston and cylinder subassembly 66.

As a result, the piston 70 within this cylinder is driven rearwardly, and hydraulic fluid is forced from the rear end of this cylinder through the conduit 62. Since the forward portion of the cylinder 38 cannot accept this fluid, it is then transferred through the conduit 44 to the lower end of the cylinder 32 and fills the enlarged volume behind the forwardly moving piston 34. It will be seen that the result of this action has been a rearward movement of the piston 70 within the slave piston and cylinder subassembly 66 with a concomitant rearward movement of the throttle lever 16 so that the vehicle 12 is slowed in its forward movement.

The opposite reaction will occur in those instances where the vehicle 12 turns toward the left from its illustrated heading and the vehicle 10 remains on the illustrated forward heading. That is, in this situation, the vehicle 10 will be slowed with respect to the vehicle 12.

Consideration may next be given to the response of the closed hydraulic-mechanical system forming a portion of the invention in a situation where one of the two self-propelled vehicles 10 or 12 is displaced longitudinally with respect to (to the rear or ahead of) the other vehicle while both are moving in a forward direction. Assume, for example, that both of the vehicles maintain the illustrated heading, and that vehicle 10 commences to move ahead of vehicle 12. In this situation, the angle defined between the mounting member 18 and the transverse linking member 22 will be decreased. As a result of this change in the angle between the transverse linking member 22 and the mounting member 18, the piston rod 36 is moved rearwardly to force the piston 34 rearwardly within the cylinder 32 of the master piston and cylinder subassembly 28. At the same time, due to the forward position of the vehicle 10 with respect to vehicle 12, the angle between the transverse linking member 22 and the rigid mounting member 20 is increased. Therefore, the piston rod 40 will be moved forwardly with respect to the cylinder 38, and the piston 37 will therefore move forwardly in this cylinder.

The rearward movement of the piston 34 within the cylinder 32 causes an amount of hydraulic fluid to be forced from the lower end of the cylinder 32. Due to the concurrent forward movement of the piston 37 in the cylinder 38, it is apparent that this displaced volume of fluid from the cylinder 32 cannot move into the upper end of the cylinder 38. Likewise, it is apparent that the hydraulic fluid displaced from the forward end of the cylinder 38 cannot move through the conduit 44 into the lower end of the cylinder 32 due to the rearward movement at this time of the piston 34. It follows, therefore, that the displaced hydraulic fluid from the upper end of the cylinder 38 will move, along with the hydraulic fluid displaced from the lower end of the cylinder 32 through the conduit 52 to the upper end of the cylinder 48 of the slave piston and cylinder subassembly 50. This will result in a rearward displacement of the piston 54 within the cylinder 48 so that the throttle lever 14 is moved rearwardly and the vehicle 10 which has, prior to this time, moved ahead of the vehicle 12, will be slowed.

The slowing of the vehicle 10 will gradually result in an equalization of the angles formed between the rigid mounting members 18 and 20 and the transverse linking member 22 so that the compensatory slowing action of the vehicle 10 will be moderated as the vehicles draw abreast. It will be seen that as the piston 54 within the cylinder 48 moves rearwardly, hydraulic fluid contained within this cylinder to the rear of the moving piston is forced from the rear end of the cylinder through the conduit 46 to the upper end of the cylinder 32. It is also possible for a portion of this displaced hydraulic fluid to pass through the conduit 42 to the lower end of the cylinder 38. Thus, the hydraulic fluid displaced from the lower end of the cylinder 48, which is equal to the cumulative amount of hydraulic fluid introduced to the upper end of this cylinder as a result of the displacements of fluid from the upper end of cylinder 38 and the lower end of cylinder 32, will be exactly sufficient to compensate for this displaced fluid, and such compensation will occur on the opposite side of the pistons 34 and 37 from the side toward which these pistons are moving in their respective cylinders.

It will be apparent from the foregoing discussion that the opposite reaction occurs in situations in which the vehicle 12 moves ahead of the vehicle 10. Here, the closed hydraulic-mechanical system forming a part of the invention will react to such longitudinal offset of the vehicle 12 with respect to the vehicle 10 by forcing the throttle lever 16 rearwardly to slow the vehicle 12 and realign the vehicles abreast of each other. It may also be seen from what has been said that the extent to which either of the vehicles is slowed due to its having moved ahead of the other vehicle will be in direct proportion to the distance which the leading vehicle has moved ahead of the other vehicle. Finally, the reader can perceive from the foregoing description that when the volumes of the hydraulic cylinders 32 and 38 are made large relative to the volumes of the cylinders 48 and 64 forming portions of the slave piston and cylinder assemblies 50 and 66, respectively, the response and length of stroke of the piston rods 56 and 72 and of the throttle levers 14 and 16, respectively, are quickened and increased.

A further and more complete understanding of my invention can be derived from a discussion of the steering and lateral separation means used in conjunction with the closed hydraulic-mechanical system which has been discussed in referring to FIG. 1. FIG. 2 is a top plan view of two agricultural tractors 110 and 112 which are being controlled by the control system of the present invention as they move forward on the heading illustrated in FIG. 2. The steering linkage which is provided is designated generally by reference numeral 114 and includes a transverse linking member 116 of the type hereinbefore generally described. The transverse linking member 116 is, in the illustrated form of the invention, a tubular member having a pair of apertures 118 and 120 formed therein adjacent the end portions of the transverse linking member, which end portions are connected to the tractors 110 and 112 in a manner to be hereinafter described. The apertures 118 and 120 permit hydraulic conduits to be extended through the transverse linking member and thus protected over most of their length. The hydraulic conduits are connected in the closed hydraulic-mechanical system forming a portion of the invention in the manner hereinbefore described.

The opposite ends of the transverse linking member 116 are pivotally connected to rigid mounting members 122 (in the case of the vehicle 110) and 124 (in the case of the vehicle 112). The rigid mounting member 122 is mounted on a mounting fixture designated generally by reference numeral 126, and the mounting fixture is connected to the forward end of the tractor 110 through a mounting frame designated generally by reference numeral 127. In like manner, the rigid mounting member 124 is mounted on a mounting fixture 128 which is connected through a mounting frame 129 to the forward end of the tractor 112. Extending transversely from the rigid mounting members 122 and 124 are mounting arms 130 and 132, respectively, and these mounting arms are pivotally secured at their outer ends to cylinders 134 and 136, respectively, which form portions of master piston and cylinder subassemblies of the type hereinbefore described. In other words, the cylinders 134 and 136 depicted in FIG. 2 correspond in function to the cylinders 32 and 38 illustrated in FIG. 1. The cylinders 134 and 136 contain pistons which are secured to piston rods 138 and 140, respectively, and these piston rods are pivotally secured to the transverse linking member 116.

The details of construction of the mounting fixtures 126 and 128, and of the mounting frames 127 and 129 are best illustrated in FIGS. 4 and 5. Since the mounting fixture 126 is constructed similarly to the mounting fixture 128, and since the mounting frame 127 is constructed similarly to the mounting frame 129, only one of each of these subassemblies will be described as such subassembly is illustrated in FIGS. 4 and 5. The mounting fixture 126 includes a pair of plates 126a and 126b secured to a central block 126c which is cut away at the corners in order to accommodate four peripherally grooved rollers 142 which are rotatably mounted between the plates 126a and 126b. The rollers 142 engage elongated guide plates 144 forming a portion of the mounting frame 127. The mounting frame 127 further includes a pair of end plates 146 and 148 between which the guide plates 144 are secured. Also, the mounting frame 127 further includes a back plate 149 which is used to rigidly secure the mounting frame to the forward end of the tractor. The rigid mounting member 122 is secured to the plate 126a forming a portion of the mounting fixture 126 and projects forwardly therefrom as best illustrated in FIGS. 2 and 4.

Secured centrally on the plate 126b forming a portion of the mounting fixture 126 is a downwardly projecting steering linkage anchor rod 150. The lower end of the steering linkage anchor rod 150 is pivotally connected to a transverse steering link 152 which is pivotally connected at its outer end to a main steering link 154. The main steering link 154 is rigidly connected to the hub upon which the right forward wheel of the tractor 110 is connected and is also pivotally connected at an end opposite its end connected to the transverse steering link 152 to a connecting link 156. The connecting link 156 is pivotally connected to a short link 158 which is rigidly connected to the hub of the left front wheel of the vehicle 110.

As has been previously indicated, the mounting frame 129 which is secured to the forward end of the tractor 112 is constructed identically to the mounting frame 127 illustrated in FIG. 4 and hereinbefore described. Similarly, the mounting fixture 128 is constructed identically to the mounting fixture 126. It will be perceived that the mounting fixtures 126 and 128 are mounted within their respective mounting frames 127 and 129 so that the mounting fixtures can rollably move in a transverse direction with respect to the tractors 110 and 112. It will further be noted that the transverse steering link 152, main steering link 154, connecting link 156 and short link 158 utilized on both the tractors 110 and 112 interconnect the forward wheels of the tractors through the mounting fixtures 126 and 128.

Thus, as the wheels of one of the tractors, say, the tractor 110, are turned toward the right, the effect of this movement is to draw the transverse steering link 152 toward the right to force the mounting fixture 126 to move toward the right along the guide plates 144 forming a portion of the mounting frame 127. This movement of the mounting fixture 126 also causes the rigid mounting member 122 to move toward the right so that the transverse linking member 116 is moved toward the right. This movement of the transverse linking member 116 causes a concurrent rightward movement of the mounting fixture 128 secured to the mounting frame 129 associated with the tractor 112. As the mounting fixture 128 moves toward the right on the mounting frame 129, the forward wheels of the tractor 112 are turned in this direction as a result of the connection to these wheels of the transverse steering link 152, main steering link 154, connecting link 156 and short link 158. Summarily, then, a turning movement either toward the right or toward the left originating with either the tractor 110 or the tractor 112 will be transferred through the described linkage to the steering wheels of the other tractor so that both tractors turn concurrently and by a similar amount. This steering connection is used conjunctively with the closed hydraulic-mechanical system of the invention in a manner hereinafter explained in greater detail.

Figure 3:
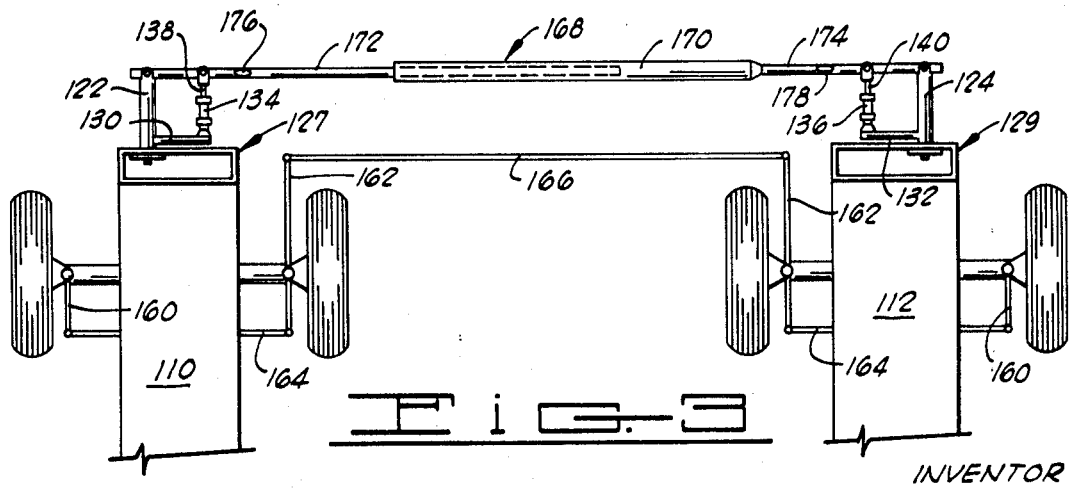
FIG. 3 is a top plan view similar to FIG. 2, but illustrating a modified embodiment of portions of the invention and only the forward portions of the interconnected farm tractor vehicles.

An alternate embodiment of the invention which effects concurrent steering control of both vehicles is illustrated in FIG. 3. Here, only the forward portion of the tractors 110 and 112 is illustrated. The front wheels of the tractor 110 are connected by a short steering link 160 and a main steering link 162 to a connecting link 164. The steering links 160 and 162 are connected to the hubs of the wheels so that they are pivoted as the wheels are turned, and are pivotally connected to the connecting link 164. In identical fashion to the arrangement utilized with the tractor 110, the tractor 112 is provided with a main steering link 162, a short steering link 160, and a transverse connecting link 164. Pivotally connected between the forward ends of the main steering links 162 of the two tractors is a steering control bar 166. It will be perceived that as the front wheels of either of the tractors 110 or 112 are turned either to the right or to the left, the described steering linkage effects a similar turning movement by the steering wheels of the second tractor so that both tractors are turned by an identical amount and in an identical direction.

When a steering interconnection or linkage of the type depicted in FIG. 3 and hereinbefore described is utilized, then it is desirable to provide a transverse linking member of the type hereinbefore described which can undergo a foreshortening or lengthening to accommodate slight variations in the distances which may separate the rigid mounting members 122 and 124 at times when the tractors undergo a turning movement. In this arrangement, these rigid mounting members 122 and 124 are rigidly mounted on the mounting frames 127 and 129, rather than being rollably mounted thereon through the instrumentality of mounting fixtures.

In the FIG. 3 embodiment, the transverse linking member is designated generally by reference numeral 168 and includes a sleeve portion 170 which slidingly or telescopingly receives a tubular insert portion 172. The sleeve portion 170 is connected to, or formed integrally with, a tubular portion 174 and, if desired, the hydraulic conduits utilized in the system can be extended through the hollow interior of these telescoped members by passing the conduits through the access ports or apertures 176 and 178. As previously described, the rigid mounting members 122 and 124 are pivotally connected to the opposite ends of the transverse linking member 168. Also, the piston rods 138 and 140 are pivotally connected to the transverse linking member 168. The other portions of the structure depicted in FIG. 3 are substantially identical to those which have been hreinbefore described in referring to FIG. 2 and bear identical reference numerals.

Considering now the control function of the present invention as the invention is constituted by the steering interconnection assembly and the closed hydraulic-mechanical system functioning conjuctively, let it be assumed that the tractor 110 is turned to the left by an operator on that tractor. In the first instant after such turn is initiated, the tractor 112 will respond with a substantially identical turning movement as a result of the interconnection of the steering systems of the two vehicles by a linkage either of the type illustrated in FIG. 2 or of the type illustrated in FIG. 3. When the vehicles 110 and 112 have been turned to the left by an identical degree as a result of the interconnection of their respective steering systems, the result is that vehicle 10 is brought into a position relative to vehicle 12 in which it is longitudinally ahead or forward of the vehicle 112. The result is that the transverse linking member 114 or 168, as the case may be, becomes angled with respect to the rigid mounting members 122 and 124 secured to the forward ends of the two tractors. The effect of this angulation has been previously described, and specifically, the response of the control system of the present invention when the tractor 110 moves ahead of the tractor 112 has been discussed. The response of the control system functions to move the throttle lever of the tractor 110 rearwardly to slow this tractor and permit the tractor 112 to move upwardly until the vehicles are abreast. During the turn, the tractor 110 which is nearest the center of the turning arc shall describe a sharper arc than the tractor 112 farthest from the center of the turning arc, and will therefore tend to precede the latter vehicle and to assume a heading which is away from the heading of the tractor on the outside of the turn. Both of these conditions will result in the slowing of the tractor nearest to the center of the turning arc. Upon resumption of straight line travel by the tractor 110 as controlled by the operator riding thereon, the longitudinal control system of the present invention will cause the tractor 110 to regain its original speed. The tractor 112 will be maintained abreast of the tractor 110 as the original speed is regained.

It will be apparent that a turning movement to the right originated at the tractor 110 will result in a similar turning movement to the right in which the two vehicles are maintained abreast since the closed hydraulic-mechanical system will at this time function to slow the speed of the tractor 112 in moving through its arc, and permit the tractor 110 to move at a relatively greater speed in transversing its greater arc. It should be pointed out that if the tractor 110 is turned so sharply toward the right that the center of curvature of the arc through which it moves is inside of the center of curvature of the arc through which the tractor 112 moves, then the tractor 112 steering gear will be driven to its extreme limit of movement toward the right by the steering control bar 166 (or by the transverse linking member 114). The respective transverse linking member and steering control bar shall then act upon the steering gear of the tractor 110 forcing it back to the left slightly so as to maintain the lateral separation between the vehicles which is defined by the limit of steering gear articulation, or by the limit of travel of the mounting fixtures 126 and 128 on their respective mounting frames 127 and 129 in the case of the system illustrated in FIG. 2.

The foregoing discussion, in which reference has been made to FIGS. 1–5, will serve to illustrate how the system for maintaining laterally spaced vehicles longitudinally abreast functions to obtain the hereinbefore described objects. It will be perceived that the system permits a single operator to control two vehicles in a manner to permit these vehicles to travel abreast at all times, including travel on a straightaway in a forward direction, and in swinging both vehicles through an arcuate path during a turning movement.

Figure 6:
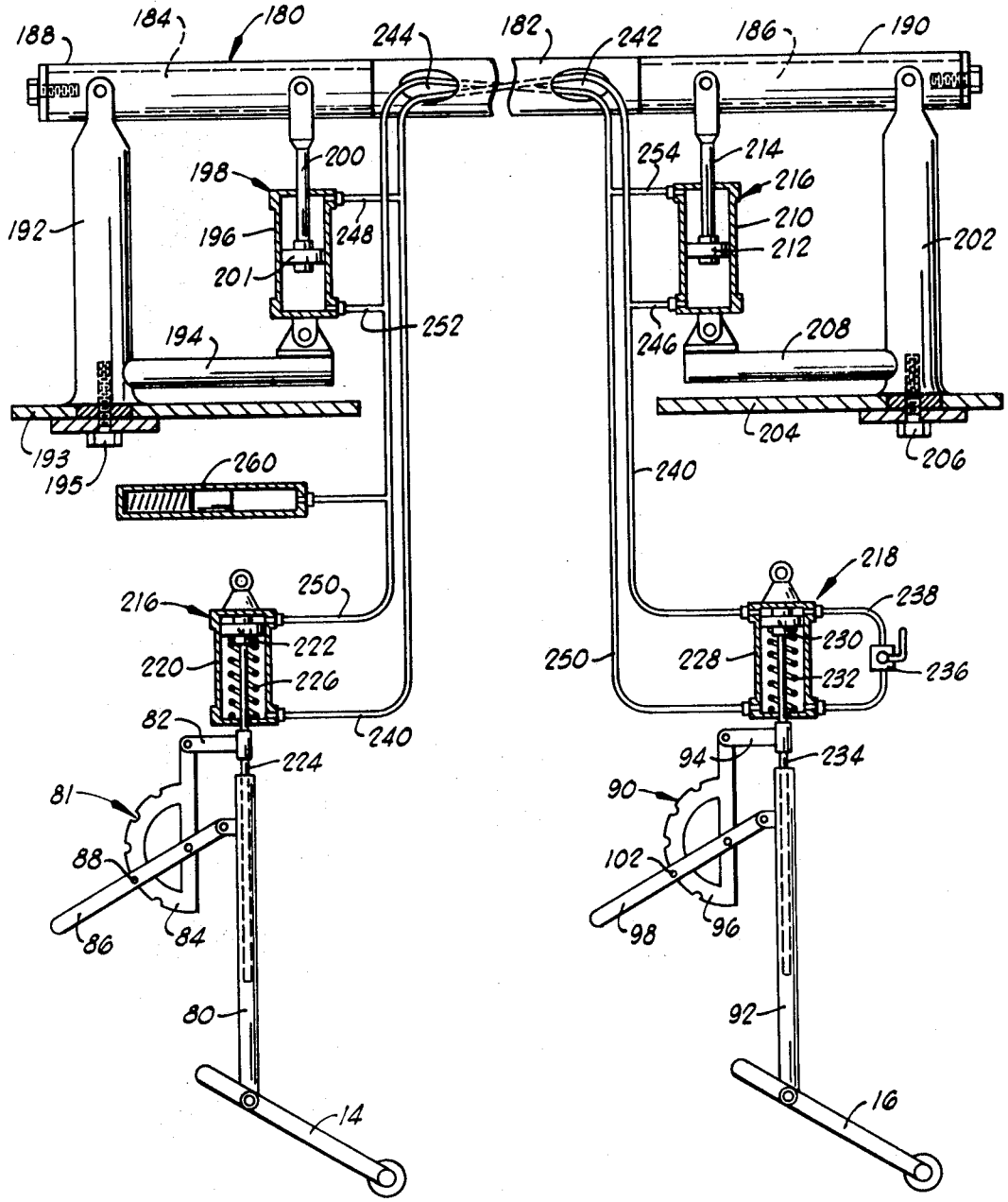
FIG. 6 is a plan view of the closed hydraulic system and associated mechanical linkage utilized in one embodiment of the invention.

A more specific and detailed form of the invention is illustrated in FIG. 6 of the drawings. As here illustrated, the transverse linking member is of the type depicted in FIG. 2 (non-telescoping) and is designated generally by reference numeral 180. The transverse linking member 180 includes a tubular central portion 182 which has projecting from opposite ends thereof, relatively small diameter solid portions 184 and 186. The small diameter solid portions 184 and 186 are received within elongated sleeves 188 and 190, respectively. A rigid mounting member 192 is pivotally secured at its forward end to the sleeve 188 for pivotation about a vertical axis (transversely with respect to the interconnected vehicles), and this rigid mounting member is secured at its base or rear end to a mounting fixture 193 of the type hereinbefore described. The mounting member 192 is pivotally secured to the mounting fixture 193 by means of a threaded bolt 195 which permits the mounting member to swivel or pivot about a horizontal axis. A mounting arm 194 is rigidly secured to the mounting member 192, and projects normal thereto and in a transverse direction with respect to a vehicle upon which the mounting fixture 193 is mounted by means of a mounting frame (not shown) of the type heretofore described. A double acting hydraulic cylinder 196 is pivotally secured to the inner end of the mounting arm 194 and is a part of a master piston and cylinder subassembly 198. Extending forwardly from the cylinder 196 is a piston rod 200 which is pivotally connected at its outer end to the sleeve 188 so that this piston rod can pivot about a vertical axis extending through this sleeve.

In similar fashion, a rigid mounting member 202 has its base connected to a mounting fixture 204, and has its forward end pivotally connected to the sleeve 190 for pivotation about a vertical axis. It will be noted that, like the mounting member 192, the mounting member 202 is pivotally connected to the mounting fixture 204 by means of a threaded pivot bolt 206 so that the mounting member may turn or swivel about a horizontal axis. Projecting normal to the mounting member 202 is a mounting arm 208 which pivotally supports a double acting cylinder 210 at its outer end. The double acting cylinder 210 contains a piston 212 which is secured to one end of a piston rod 214 connected at its outer or free end to the sleeve 190 by means of a pivotal connection. The cylinder 210, piston 212 and piston rod 214 form parts of a master piston and cylinder subassembly designed generally by reference numeral 216.

The sleeves 188 and 190 to which the rigid mounting members 192 and 202, as well as the piston rods 200 and 214 are pivotally connected is rotatably mounted on the small diameter solid portions 184 and 186 of the linking member 180 so that these sleeves can rotate about the longitudinal axis of the linking member. This type of connection accommodates pitching motions by either of the tractors 110 or 112 to which the rigid mounting members 192 and 202 are connected, so that an up-and-down motion by the forward end of either of the vehicles can be accommodated through the rotational movement of one or both of the sleeves 188 and 190 on the small diameter solid portions 184 and 186. It should further be pointed out that rolling action by either tractor is accommodated by the pivotal connection of the respective rigid mounting members 192 and 202 to the mounting fixtures 193 and 204, respectively. Thus, should either of the tractors 110 or 112 to which the mounting members 192 and 202 are connected through the mounting fixtures 193 and 204 roll to the inside or to the outside with respect to the other vehicle, this rolling motion will be accommodated by pivotation of the respective rigid mounting member 192 or 202 on the mounting fixture 193 or 204 to which it is pivotally connected.

As previously described, the control system of the invention includes, in addition to the master piston and cylinder subassemblies 198 and 216, a pair of slave piston and cylinder subassemblies. In the embodiment of the inventioned illustrated in FIG. 6, these subassemblies are designated by reference numerals 216 and 218. The slave piston and cylinder subassembly 216 includes a cylinder 220 which contains a piston 222 slidably mounted within the cylinder and secured to a piston rod 224. It will be noted that the diameter of the piston rod 224 is enlarged on opposite sides of the piston 222 so as to limit the movement of the piston within the cylnder 220, and to prevent if from moving completely to the forward end of the cylinder under the impress of hydraulic fluid. The cylinder 220 contains a helical spring 226 which constantly biases the piston 222 toward the forward end of the cylinder so that the piston assumes the position illustrated in FIG. 6 when the full biasing effect of this spring is permitted to act against a force of lesser magnitude offered by hydraulic fluid on the opposite side of the piston from the spring.

The slave piston and cylinder subassembly 218 is constructed substantially identically to the slave piston and cylinder subassembly 216 and thus includes a cylinder 228 which contains a piston 230 which is constantly biased toward the forward end of the cylinder by helical spring 232. The piston 230 is secured to a piston rod 234 which has enlarged diameter portions on opposite sides of the piston so as to limit the movement of the piston within the cylinder 228 as hereinbefore described. In referring to the slave piston and cylinder subassembly 218, it will be noted that the hydraulic shunt valve 236 is provided in a shunt conduit 238 which extends between the forward portion of the cylinder 228 and the rear portion thereof. The function of the shunt valve 236 and shunt conduit 238 is to equalize fluid volumes on opposite sides of the piston 230 at such times as excessive imbalance in fluid volumes may occur. A pressure relief function may also be built into the valve 236 to permit equalization of fluid pressure on opposite sides of the piston 230 on some occasions where this is desirable to prevent rupture of the hydraulic system, or to relieve excessive pressure which may have developed on one side or the other of the piston 230.

The master piston and cylinder subassemblies 198 and 216 are intercounnected with slave piston and cylinder subassemblies 216 and 218 by a plurality of conduits for conveying hydraulic fluid. Thus, a conduit 240 extends from the forward end of the cylinder 228 into the interior of the tubular portion 182 of the transverse linking member 180 via an aperture 242, and then out of this tubular member through an aperture 244. The opposite end of the conduit 240 is connected to the rear end of the cylinder 220 forming a part of the slave piston and cylinder subassembly 216. A branch conduit 246 extends from the conduit 240 to the rear portion of the cylinder 210 forming a portion of the master piston and cylinder subassembly 216. In similar fashion, a branch conduit 248 extends from the conduit 240 to the forward portion of the cylinder 196 forming a portion of the master piston and cylinder subassembly 198.

Extending from the rear end of the cylinder 228 forming a portion of the slave piston and cylinder subassembly 218 to the forward portion of the cylinder 220 forming a part of the slave piston and cylinder subassembly 216 is a conduit 250. A branch conduit 252 interconnects the rear portion of the cylinder 196 with the conduit 250, and branch/conduit 254 interconnects the upper portion of the cylinder 210 with the conduit 250.

In the embodiment of the invention illustrated in FIG. 6, variable interlink control means 81 and 90 of the type hereinbefore described are utilized for adjustably interconnecting the piston rods 224 and 234 with throttle levers 14 and 16. The throttle levers 14 and 16 are, of course, carried on two vehicles to be interconnected by the control system of the invention, and function to control the speed of these vehicles in the manner to which reference has been previously made. The variable interlink control means 81 and 90 contain the structural elements to which reference has been previously made, and these control elements have identical reference numerals to those used in referring to the system schematically illustrated in FIG. 1. Thus, the piston rod 224 extends slidingly into a sleeve 80, and the piston rod 234 extends slidingly into the sleeve 92. The distance by which the piston rod 224 extends into the sleeve 80 can be adjusted by pivoting the interlink control lever 86 about its point of pivotal connection to the arcuate indexing member 84 so as to move the sleeve forwardly or rearwardly with respect to the tractor. It will be perceived that this adjustment of the relationship between the sleeve 80 and the piston rod 224 also has the effect of pivoting the throttle lever 14 forwardly or rearwardly. A similar adjustment is obtainable by the use of the interlink control lever 98 so as to move the throttle lever 16 forwardly or rearwardly while changing the position of the sleeve 92 relative to the piston rod 234.

A source 260 of hydraulic pressure is connected to the conduit 250 and provides a constant positive fluid pressure within the closed hydraulic system precluding any induction of air into the system, and also functioning to replace any hydraulic fluid which may be lost through leakage from the system. The source 260 of hydraulic fluid also is capable of receiving hydraulic fluid from the system if the pressure within the system should become excessive.

In describing the operation of the embodiment of the invention illustrated in FIG. 6, let it first be assumed that the single operator of the two vehicles is to directly control, and be located in, the left vehicle (which has mounted thereon the slave piston and cylinder subassembly 216 and the master piston and cylinder subassembly 198). At the outset of the operation of the vehicles, the operator shortens the variable interlink control means 90 of the right vehicle by moving the variable interlink control lever 98 rearwardly. This has the effect of moving the sleeve 92 forwardly on the piston rod 234, and of pivoting the throttle lever 16 in a forward direction to impart a forward speed to the right vehicle (assuming that the throttle lever was initially at the lowest running or idling speed possible before being moved forwardly by this action of the operator). The right vehicle will then continue to move forward until the longitudinal position control system of the invention shall act to drive the double acting piston 230 rearwardly so as to move the piston rod 234 to the rear and thus also pivot the throttle lever 16 toward the rear. The effect of the control system will then be to slow the vehicle on the right, or bring it substantially to a halt.

The operator then moves to the left vehicle, and actuates the variable interlink control means 81 by moving the interlink control lever 86 rearwardly. This moves the sleeve 80 forwardly on the piston rod 224, and pivots the throttle lever 14 forwardly thus causing the left vehicle to move in a forward direction. It will be recalled that, at this time, the piston 230 within the cylinder 228 has previously been forced rearwardly against the bias of the spring 232 to a certain extent in order to slow or stop the right vehicle.

Now, as the left vehicle commences to move forwardly, the angle between the transverse linking member 180 and the rigid mounting member 192 commences to be decreased, forcing the piston rod 200 into the cylinder 196. The angle between the transverse linking member 180 and the rigid mounting member 202 commences to be increased, extending the piston rod 214 from the cylinder 210. The result of these actions of the master piston and cylinder subassemblies 198 and 216 is to effect a shifting of the piston 230 toward the forward end of the cylinder 228 (which enables the right vehicle to resume moving forwardly) until the system is balanced (which occurs at a time when the vehicles are abreast of each other and moving at substantially the same speed). The left and right hand vehicles may be halted by reversing the described process above by sequential lengthening of the variable interlink control means 81 and 90.

It will be perceived that the speed at which the vehicles move forwardly and abreast can be adjusted as desired by selecting the extent to which the interlink control levers 86 and 98 are pivoted rearwardly in carrying out the two adjustments hereinbefore described. Moreover, it is also possible to effect such adjustment in the forward speed of the two vehicles by moving the interlink control lever 86 on the left vehicle which carries the operator after the vehicles are underway. This will occur because a rearward pivotation of the interlink control lever 86 at this time will pivot the throttle lever 14 forwardly, causing the left vehicle to move ahead of the right vehicle, provided the piston 230 is not, at this time, entirely forward within the cylinder 228. The result will be a compromise adjustment of the speeds of the two vehicles to bring them abreast, with the actual forward speed of both vehicles being increased over that which obtained before the interlink control lever 86 was moved rearwardly while both vehicles were moving forward.

When both vehicles are abreast of each other and moving forwardly at maximum speed with throttle levers 14 and 16 at their forwardmost positions, a forward pivotation of the interlink control lever 86 to an intermediate position will pivot the throttle lever 14 rearwardly to an intermediate position, causing the left vehicle to slow to an intermediate speed less than maximum speed. At this time the right vehicle will move ahead of the left vehicle due to the relatively greater speed of the right vehicle. Upon this displacement of the two vehicles, the longitudinal position control system of the present invention will act to slow the leading or right vehicle until the speed of the right vehicle is substantially the same as that of the left vehicle and maintain the two vehicles in their positions relative to each other in the manner hereinbefore described. Under such conditions, an operator on the left vehicle may control the speed of the vehicle array by adjusting the interlink control lever 86 to a position corresponding to that forward speed of the vehicle array which is desired.

In FIG. 7 of the drawings, a modified embodiment of the invention which includes a manual-hydraulic interlink control meaons is illustrated. Here, master piston and cylinder subassemblies 264 and 266 are pivotally connected between a transverse linking member 180 and a pair of rigid mounting arms 194 and 208 in the manner which has been hereinbefore described. The master piston and cylinder subassembly 264 includes a cylinder 268 which has a fluid chamber 270 therein in which a piston 272 is reciprocably mounted. The piston 272 is secured to a piston rod 274 which projects through the forward end of the cylinder 268, as well as through a partition 276 forming the rear side of the fluid chamber 270.

Similarly to the master piston and cylinder subassembly 264, the subassembly 266 includes a cylinder 280 in which is reciprocably mounted a piston 282. The piston 282 is secured to a piston rod 284 which projects through the forward end of the cylinder 280 and through a partition 286 which defines a fluid chamber 288 within the cylinder 280. The construction by which the piston rods 274 and 284 are extended through walls at the opposite ends of the fluid chamber assures that little or no fluctuation in internal hydraulic fluid volume shall result from variations in piston rod volume within the closed hydraulic fluid system due to net piston rod position change as is the case in FIG. 6 where piston rods 200 and 214 extend through only one wall of their respective cylinder subassemblies.

The system depicted in FIG. 7 includes slave piston and cylinder subassemblies designated generally by reference numerals 290 and 292. The slave piston and cylinder subassembly 290 includes a cylinder 294 which is constructed similarly to the cylinders 268 and 280 utilized in the master piston and cylinder subassemblies 264 and 266. The cylinder 294 thus includes a partition 296 which defines a fluid chamber 298. Reciprocably disposed in the chamber 298 is a piston 300 which is secured to a piston rod 302. The piston rod 302 extends through the rear end of the cylinder 294 and through the partition 296. The piston 300 is biased against the partition 296 by a helical spring 304 disposed in the upper end of the forward end portion of the cylinder 294.

Similarly to the slave piston and cylinder subassembly 290, the slave piston and cylinder subassembly 292 includes a cylinder 306 which includes a transverse partition 308 which forms the forward end of a fluid chamber 310. Reciprocably mounted within the fluid chamber 310 in the cylinder 306 is a piston 312 which is secured to a piston rod 314 which extends through the rear end of the cylinder 306 and through the partition 308. The piston rod 314 is biased in a forward direction by means of a helical spring 316 so that the bias of this spring urges the piston 312 against the partition 308.

The manual-hydraulic interlink control system utilized in the embodiment of the invention depicted in FIG. 7 includes variable interlink control means 320 and 322. The variable interlink control means 320 includes a double acting piston and cylinder subassembly 324 which comprises a cylinder 326 having a transverse partition 328 extended thereacross and defining within the cylinder 326 a fluid chamber 330. Reciprocably mounted in the fluid chamber 330 is a piston 332 which is secured to a piston rod 302 which extends through the forward end wall of the cylinder 326 and the partition 328. The cylinder 326 is connected to a vehicle throttle lever 334 by a suitable link 335, and is mounted on a vehicle to be controlled so that this cylinder may move forwardly and rearwardly relative to such vehicle (and in doing so, pivot the throttle lever 334), as well as relative to the cylinder 294 of the slave piston and cylinder subassembly 290.

The manual-hydraulic interlink control means 320 also includes a piston and cylinder subassembly 336 which includes a cylinder 338 secured to the left vehicle (which carries throttle lever 334). The cylinder 338 contains a piston 340 secured to a piston rod 342 which extends through a transverse partition 344 in the cylinder 338, and through the rear wall of this cylinder, and which has its free rearward end connected to a manual interlink control lever 346.

The manual-hydraulic interlink control means 322 is constructed similarly to the manual-hydraulic interlink control means 320 and is mounted on a second of two vehicles to be concurrently controlled from a single vehicle. Thus, the manual-hydraulic interlink control means 322 includes a double acting piston and cylinder subassembly 348 which comprises a movable cylinder 350 divided by a transverse partition 352, and containing within a fluid chamber 354, a piston 356. The piston 356 is secured to the piston rod 314 which extends through the forward end wall of the cylinder 350, and through the partition 352, and is connected also to the piston 312 as hereinbefore described. The cylinder 350 is movably mounted on the right vehicle so that it is free to move toward the throttle lever 358 or toward the slave piston and cylinder assembly 292 as hereinafter described. A double acting piston and cylinder subassembly 360 includes a cylinder 362 which contains a transverse partition 364 defining within the cylinder a fluid chamber 366. A piston 368 is reciprocably mounted in the fluid chamber 366, and is secured to a piston rod 370 which extends from the cylinder 362 to a manual interlink control lever 372.

For the purpose of hydraulically interconnecting the several piston and cylinder subassemblies which are included in the two master subassemblies 264 and 266, the two slave subassemblies 290 and 292 and in the two manual-hydraulic interlink control means 320 and 322, there are provided a series of hydraulic conduits. Thus, a hydraulic conduit 374 extends from the forward portion of the fluid chamber 366 in the cylinder 362 to the rear end of the fluid chamber 341 provided in the cylinder 338. A conduit 376 interconnects the rear end of the chamber 366 in the cylinder 362 with the rear end of the fluid chamber 354 in the cylinder 350. The conduit 378 interconnects the forward end of the fluid chamber 341 in cylinder 338 with the forward end of the fluid chamber 330 in the cylinder 326. The rear end of the fluid chamber 330 in the cylinder 326 is placed in fluid communication with the forward end of the fluid chamber 354 in the cylinder 350 by a hydraulic conduit 380.

The rear end of the fluid chamber 298 within the cylinder 294 is connected to the forward end of the fluid chamber 310 in the cylinder 306 by a conduit 382. This conduit 382 is connected by a branch conduit 384 to the forward end of the fluid chamber 270 in the cylinder 268, and by a branch conduit 386 to the rear portion of the fluid chamber 288 in the cylinder 280. Finally, a hydraulic conduit 388 extends from the forward portion of the fluid chamber 298 in the cylinder 294 to the rear portion of the fluid chamber 310 in the cylinder 306. The conduit 388 has a branch conduit 390 extending therefrom to the rear portion of the fluid chamber 270 in cylinder 268 and a branch conduit 392 extending therefrom to the forward portion of the fluid chamber 288 located in the cylinder 280.

In using the embodiment of the invention depicted in FIG. 7, an operator on the right vehicle which carries the manual-hydraulic interlink control means 322 initially moves the manual interlink control lever 372 forward. This moves the double acting piston 368 forward in the chamber 366, thereby forcing hydraulic fluid from the forward portion of the fluid chamber 366 through the conduit 374 into the rear portion of the fluid chamber 341 located in the cylinder 338 of the piston and cylinder subassembly 336. This automatically moves the manual interlink control lever 346 forward due to the forward displacement of the piston 340 within the cylinder 338.

Movement of the piston 340 forwardly in the cylinder 338 will force hydraulic fluid through the conduit 378 and into the upper end of the cylinder 326. Since, as has been previously explained, the cylinder 326 is movable on the vehicle upon which it is mounted, when the piston rod 302 and the piston 332 which it carries remain stationary on such vehicle, the cylinder 326 will at this time be forced forward on the piston 332 (and relative to the vehicle) so that there is a foreshortening of the interlink control, and a concurrent pivotal movement of the throttle lever 334 toward the forward end of the vehicle on which it is located. This, of course, causes the left vehicle to move in a forward direction.

Forward movement of the cylinder 326 relative to the piston 332 causes the hydraulic fluid contained within the fluid chamber 330 to the rear of the piston 332 to be forced through the conduit 380 to the forward end of the fluid chamber 354 contained within the cylinder 350. The cylinder 350 being movable relative to the piston 356, and relative to the right vehicle upon which the subassemblies 292, 348 and 360 are mounted, the cylinder at this time moves forward, causing the throttle lever 358 to be shifted forwardly. The right vehicle is thus now underway in a forward direction. The forward movement of the cylinder 350 also decreases the volume of that portion of the fluid chamber 354 to the rear of the piston 356, and thus forces hydraulic fluid through the conduit 376 into the rear end of the fluid chamber 366 located within the cylinder 362. Thus, the augmentation of the volume of this part of the fluid chamber 366 as a result of the forward manual movement of the manual interlink control lever 372 is compensated by the ingression of hydraulic fluid into this space from the hydraulic conduit 376.

It will be perceived at this point that since both the throttle levers 334 and 358 have been moved forwardly, both vehicles are now underway at a speed which is directly related to the extent to which the manual interlink control lever 372 has been moved forwardly. With the vehicles underway, the master piston and cylinder subassemblies 264 and 266, and the slave piston and cylinder subassemblies 290 and 292 which are responsive to the change in status of the master piston and cylinder subassemblies, function in the manner hereinbefore described to maintain the vehicles abreast, both during the straight-away forward movement and during a turning movement.

It will be seen that as one of the pistons 300 or 312 shifts rearwardly within the respective cylinders 294 and 306 due to the control function of the closed hydraulic-mechanical control system, the effect will be to move the respective one of the cylinders 326 or 350 rearwardly since, at this time, the fluid located to the rear of the pistons 332 and 356 within these cylinders cannot be ejected from the cylinders through either the conduit 380 (in the case of the cylinder 326) or the conduit 376 (in the case of the cylinder 350). In a different manner of description, both the interlink control system and the hydraulic-mechanical control system are isolated, closed hydraulic circuits, and this permits hydraulic interlocking of the piston 332 with the cylinder 326, and of the piston 356 with the cylinder 350 when a change in the hydraulic status of one of the master piston and cylinder subassemblies occurs to initiate the automatic speed control function.

In order to slow or stop the vehicles which have mounted thereon the control system depicted in FIG. 7, the operator, who is located on the right vehicle, moves the manual interlink control lever 372 rearwardly, thus displacing fluid through the conduit 376 into the cylinder 350 and causing this cylinder to move rearwardly relative to the tractor upon which it is mounted and relative to the piston 356 contained therein. This stops the right vehicle. Rearward movement of the cylinder 350 forces hydraulic fluid from the forward end of the fluid chamber 354 through the conduit 380 into the rear portion of the fluid chamber 330 contained within the cylinder 326. At this time, due to the mobility of the cylinder 326 on the piston 332, the cylinder is forced rearwardly on the vehicle upon which it is movably mounted, and this effectively moves the throttle lever 334 toward the rear to slow or stop the left vehicle. Movement of the cylinder 326 toward the rear forces fluid through the hydraulic conduit 378 to the forward portion of the fluid chamber 341 within the cylinder 338 so that the piston 340 is moved rearwardly and the manual interlink control lever 346 is moved rearwardly to its original position.

An advantage of the embodiment of the invention depicted in FIG. 7 with respect to that which has been described in referring to FIG. 6 is that with the manual-hydraulic interlink control system utilized in FIG. 7, the operator can initiate the control function from a single vehicle without having to start that one vehicle forward and then shift his position to the second as has been hereinbefore described.

FIG. 8 illustrates a further embodiment of the present invention, and since some of the structural elements utilized in this embodiment of the invention are identical to those depicted in FIGS. 6 and 7 and hereinbefore described, identical reference numerals will be employed for the purpose of referring to these elements. Thus, a transverse linking member 180 is provided and is pivotally connected at its opposite ends to a pair of rigid mounting members 192 and 202. The mounting members 192 and 202 have extending therefrom mounting arms 194 and 208.

Pivotally interconnected between the mounting arm 194 and the transverse linking member 180 is a master piston and cylinder subassembly 264 which is structured identically to the same subassembly as depicted in FIG. 7. Similarly, a master piston and cylinder subassembly 266 is mounted on a second vehicle which is to be concurrently controlled. This second master piston and cylinder subassembly 266 is structured identically to this subassembly as it has been depicted and described in referring to FIG. 7. In further similarity to the embodiment of the invention depicted in FIG. 7, the embodiment illustrated in FIG. 8 includes a hydraulic branch conduit 390 which interconnects the rear portion of the chamber 270 within the cylinder 268 with a hydraulic conduit 388. The latter hydraulic conduit is connected by a branch conduit 392 to the forward portion of the fluid chamber 288 located within the cylinder 280. The hydraulic conduit 382 is, as previously described, connected by a branch conduit 386 to the rear portion of the chamber 288 in cylinder 280, and by a branch conduit 384 to the forward portion of the fluid chamber 270 within the cylinder 268.

In further describing the system depicted in FIG. 8, let it be assumed that there are a plurality of speed control devices on each of a pair of vehicles being moved concurrently in a side-by-side (abreast) relationship as hereinbefore described. In this illustrated embodiment, three of such speed control devices are provided on each of the vehicles, these being lever type controls and denominated by reference numerals 400, 402 and 406 in the case of the left vehicle, and 408, 410 and 412 in the case of the right vehicle. As exemplary of types of multiple speed controls which may be utilized in a system of this type, the clutch, brake and accelerator of a self-propelled vehicle may be cited. It is proposed by the use of the system depicted in FIG. 8 to sequentially actuate the several speed control devices in such a way that a variation in the degree of response of each vehicle to the control system will be experienced at different times, which times are dependent upon the degree to which usage of the several speed controls may be needed to slow or stop either vehicle with maximum effectiveness at that time.

The speed control lever 406 is connected by a suitable interlink control system 416 of the type hereinbefore described to a first slave piston and cylinder subassembly 418. It will be noted that the slave piston and cylinder subassembly 418 is constructed similarly to those hereinbefore described, and includes a cylinder 420 secured to the left vehicle and in which is located a transverse partition 422 which defines within the cylinder 420 a fluid chamber 424. A piston 426 is reciprocably mounted within the fluid chamber 424, and is secured to a piston rod 428 which extends through the partition 422 and the rear wall of the cylinder 420. A spring 430 is provided in the forward portion of the cylinder 420 and cooperates with the piston rod 428 for biasing the piston 426 to the illustrated position. It will be noted that the hydraulic fluid conduit 388 passes through the cylinder 420 and through the partition 422 to permit hydraulic fluid to be directed against the forward side of the piston 426. It will further be noted that the conduit 382 enters the rear portion of the cylinder 420 to direct hydraulic fluid into the space to the rear of the piston 426.

An interlink control system 432 interconnects the speed control lever 402 to a second slave piston and cylinder subassembly 434 in the manner hereinbefore described. The second slave piston and cylinder subassembly includes a cylinder 436 divided by a transverse partition 438 and containing a fluid chamber 440. A piston 442 is reciprocably disposed within the fluid chamber 440 of the cylinder 436, and is connected to a piston rod 444. A spring 446 is used to constantly urge the piston rod 444 and piston 442 to the illustrated position. The diameters of the cylinder 436 and of the piston 442 reciprocably disposed therein are made significantly smaller than the corresponding diameters of the cylinder 420 and the piston 426 forming a part of the first slave piston and cylinder subassembly 418. It therefore follows that the area of the piston 442 is substantially smaller than the area of the piston 426. A conduit 450 places the forward portion of the fluid chamber 424 within the cylinder 420 in communication with the forward portion of the fluid chamber 440 within the cylinder 436. Similarly, a conduit 452 places the rearward portion of these two fluid chambers in communication with each other.

A third slave piston and cylinder subassembly is mounted on the left vehicle of the paired vehicles, and is designated generally by reference numeral 454. The subassembly 454 includes a cylinder 456 having a transverse partition 458 located therein and defining a fluid chamber 460. A piston 462 is reciprocably mounted in the fluid chamber 460 and is keyed to a piston rod 464. A spring 466 exerts a continual bias on the upper end portion of the piston rod 464 tending to move the piston 462 to the upper end of the fluid chamber 460 to the position illustrated in FIG. 8. The piston rod 464 is connected through an interlink control system 470 of the type hereinbefore described to the speed control lever 400. The forward ends of the chambers 440 and 460 are interconnected by a conduit 472, and the rear ends of these same chambers are interconnected by a conduit 474. The cylinder 456 and piston 462 are of lesser diameter than the corresponding cylinder and piston, 436 and 442, respectively, in the second slave piston and cylinder subassembly. Therefore the piston 462 is of lesser area than the piston 442.

Since the three slave piston and cylinder subassemblies 418, 434 and 454 which are mounted on the left vehicle are identical in construction to three other slave piston and cylinder subassemblies which are mounted on the right vehicle and illustrated in FIG. 8, the latter slave piston and cylinder subassemblies, and the component parts thereof, have been assigned reference numerals which are identical to those used in describing the slave piston and cylinder subassemblies mounted on the left vehicle, except that the reference numerals used for these structures as mounted on the right vehicle have, in each case, been assigned an odd reference numeral which is one digit higher than the corresponding structural element in the left slave subassemblies. Thus, the three slave piston and cylinder subassemblies mounted on the right vehicle are referred to as a first subassembly 419, a second subassembly 435 and a third subassembly 455. The interlink control systems which are utilized for adjustably interconnecting the piston rods 429, 445 and 465 with the speed control levers 408, 410 and 412 located on the right vehicle are also identical in construction to the interlink control systems 416, 432 and 470 utilized on the left vehicle, and therefore these systems as employed on the right vehicle have been assigned an odd numbered reference numeral which is one numeral higher than the corresponding structure on the left vehicle. The hydraulic fluid conduits 382 and 388 are connected to the forward and rear portions, respectively, of the fluid chamber 425 in the cylinder 421 of the slave piston and cylinder subassembly 419, and are connected to the rear and forward portions, respectively, of the fluid chamber 424 in the cylinder 420 of the slave piston and cylinder subassembly 418.

As has been indicated, the surface areas of the pistons 426, 442 and 462 located within the cylinders 420, 436 and 456 are of decreasing magnitude in the order named, and the same relationship is true of the pistons 427, 443 and 463 located in the cylinders 421, 437 and 457. At such time as the response of the closed hydraulic-mechanical system hereinbefore described functions to direct hydraulic fluid through the conduit 388 into the array of slave piston and cylinder subassemblies 418, 434 and 454 located on the left vehicle, the piston 426 located within the cylinder 420 of the slave subassembly 418 shall be the first to be actuated in a rearward movement since it has the largest cross-sectional area of the three pistons. (This assumes the biasing springs 430, 446 and 466 to be of equal strength.) Subsequently to the rearward actuation of the piston 426 within its cylinder 420, the pistons 442 and 462 will be actuated in a rearward movement in their respective cylinders in successive sequence. In returning to their rest positions under the bias of their respective springs, the sequence of actuation of the pistons 462, 442 and 426 will be reversed. Thus, the piston 462 will be moved forward prior to the forward movement of the piston 442, and the latter piston will be moved forward prior to the forward movement of the piston 426. The same type of sequential actuation occurs in the case of the pistons 427, 443 and 463 located in the cylinders 421, 437 and 457 of the array of slave piston and cylinder subassemblies 419, 435 and 455 which are mounted on the right vehicle.

It is thus apparent that several types of speed control devices located on the two tractors which are being concurrently controlled can be actuated by the system of the present invention in a selected sequence by proper construction of the several slave piston and cylinder subassemblies which are provided, and which are individually associated with an individual one of the speed control devices. It may be here pointed out that the volume capacity of each of the fluid chambers 270 and 288 within the cylinders 268 and 280 forming portions of the master piston and cylinder subassemblies 264 and 266 must be significantly greater than the combined fluid volumes of the fluid chambers contained within the cylinders 420, 436 and 456 of the left hand array of slave piston and cylinder assemblies, or of the corresponding fluid chambers in the right hand array of slave piston and cylinder subassemblies, respectively, in order for actuation of either of the master subassemblies to be effective in ultimately actuating in the described sequence all three of the slave subassemblies on either of the vehicles.

Another embodiment of my invention using a modified interlink control system is depicted in FIG. 9 of the drawings. In this illustration, the transverse linking member, the mounting arms and the master piston and cylinder subassemblies are identical to those which are employed in the embodiments of the invention illustrated in FIGS. 7 and 8 and have therefore been assigned identical reference numerals. The system depicted in FIG. 9 is provided with a slave piston and cylinder subassembly 490 which is mounted on the left vehicle, and a slave piston and cylinder subassembly 492 which is located on the right vehicle. The slave piston and cylinder subassembly 490 includes a cylinder 494 which contains a transverse partition 496 defining within the cylinder a fluid chamber 498. A piston 500 is reciprocably mounted in the fluid chamber 498 and is secured to a piston rod 502 which extends through the transverse partition 496 and through the rear end of the cylinder 494. The cylinder 494 is mounted on the left vehicle and does not move relative thereto. The piston rod 502 is connected to a speed control lever 514 which is mounted on, and controls the speed of, the left vehicle.

The slave piston and cylinder subassembly 492 includes a cylinder 504 secured to the right vehicle and containing a transverse partition 506 which defines a fluid chamber 508 within the cylinder. A piston 510 is reciprocably mounted within the fluid chamber 508 and is secured to a piston rod 512 which projects through the transverse partition 506 and through the rear wall of the cylinder 504. The piston rod 512 is secured to a throttle lever 516 which is mounted on, and controls the speed of, the right vehicle.

The form of interlink control system depicted in FIG. 9 facilitates the elimination of the biasing springs utilized in the slave piston and cylinder subassemblies of other embodiments of the invention as hereinbefore described. The interlink control systems employed are designated by reference numeral 520 in the case of the left vehicle, and 522 in the case of the right vehicle. The interlink control system 520 includes an elongated piston rod 524 which has secured thereto for movement therewith, a pair of spring posts 526 and 528. The spring posts 526 and 528 are secured in longitudinally spaced relation along the piston rod 524 and engage the opposite ends of a spring 530 which is secured intermediate its length to a projecting stud 532 which is secured to, and projects from, the piston rod 502. The piston rod 524 projects through the rear end of a cylinder 534 which contains a transverse partition 536 defining a fluid chamber 538 within the cylinder. A piston 540 is reciprocably mounted in the fluid chamber 538 and is secured to the piston rod 524. The free outer end of the piston rod 524 is connected to a manual interlink control lever 544.

The interlink control system 522 is constructed like the interlink control system 520 and includes a pair of longitudinally spaced spring posts 546 and 548 which are secured to, and project from, a piston rod 550. A spring 552 is connected between the spring posts 546 and 548 and is secured at an intermediate portion to a projecting stud 554 which is secured to the piston rod 512. The piston rod 550 projects into a cylinder 556 which contains a transverse partition 558 defining a fluid chamber 560 within the cylinder. The fluid chamber 560 contains a piston 562 which is secured to the piston rod 550. At its end opposite the end disposed within the cylinder 556, the piston rod 550 is pivotally connected to a manual interlink control lever 564.

The hydraulic conduits used for interconnecting the several cylinders depicted in the embodiment of the invention shown in FIG. 9 include the conduits 382 and 388, hereinbefore described as interconnecting the cylinders of the slave piston and cylinder assemblies, these being numbered 504 and 494 in the case of the FIG. 9 embodiment. There is also provided in this embodiment of the invention, a hydraulic fluid conduit 570 which extends between the forward end of the piston 556 and the rear end of the piston 534. Another conduit 572 extends from the forward end of the cylinder 534 to the rear end of the cylinder 556.

The embodiment of the invention illustrated in FIG. 9 differs from those hereinbefore described by the inclusion therein of a manual-hydraulic variable position spring bias assembly used with the speed control linkage. FIG. 1 has a continuously acting directional spring bias applied to the piston rods included in the slave piston and cylinder subassemblies. The embodiment shown in FIG. 9 does not include variable interlink controls in the same sense that such controls have been provided in the other embodiments, and the piston rods 502 and 512 actually connect directly to the throttle levers 514 and 516, respectively, in this system. If, in the system illustrated in FIG. 9, the pistons 500 and 510 within the cylinders 494 and 504 of the slave piston and cylinder subassemblies 490 and 492 are moved to their limit of forward travel within the respective cylinders, then this embodiment of the invention is at this time equivalent in its function and status to the spring biased arrangement illustrated in FIG. 1 and other figures of the drawing, where the variable interlink control means have been foreshortened to their shortest position, and the throttle levers which they interconnect to a piston rod of the slave piston and cylinder subassemblies are at their fastest or more forward positions. When the pistons 500 and 510 of the slave piston and cylinder subassemblies 490 and 492 are moved to their most extreme rearward positions within their respective cylinders, the vehicles on which any of the embodiments of the invention are mounted are stopped.

In the embodiment of the invention depicted in FIG. 9, however, if, while the vehicles are underway one vehicle shall precede or move ahead of the other, then the longitudinal position control system shown here shall not only act to slow the leading vehicle, but shall act to increase the speed of the following vehicle. Thus, for example, if the variable position spring bias shall occupy an intermediate position, such as it is shown occupying in FIG. 9, the longitudinal position control system shall function as follows. At the time that this intermediate position is assumed by the manual interlink control levers 544 and 564, the pistons 500 and 510 will be in an intermediate position within their respective cylinders 494 and 504, and the throttle levers 514 and 516 will be in a position such that both vehicles are moved forward at a moderate speed.

If now the left vehicle shall be longitudinally displaced ahead of the right vehicle while both vehicles are on a forward heading, the angle formed by the mounting member 192 with the transverse linking member 180 will be decreased. The piston rod 274 will be moved into the cylinder 268 and hydraulic fluid will be forced from this cylinder into the branch conduit 390. From the branch conduit 390, hydraulic fluid may flow through the conduit 388 into the forward portion of the fluid chamber 498 in the cylinder 494 thus forcing the piston 500 rearwardly. Rearward movement of the piston 500 will effect a rearward movement of the piston rod 502 and rearward pivotation of the throttle lever 514. Thus, the left vehicle will be slowed. Simultaneously, hydraulic fluid forced from the rear portion of the fluid chamber 270 located within the cylinder 268 moves through the branch conduit 390 and conduit 388 into the rear portion of the fluid chamber 508 in the cylinder 504 of the slave piston and cylinder subassembly 492. This will cause the piston 510 to move forward, and a concurrent movement in a forward direction of the throttle lever 516 will result. The speed of the right vehicle will thus be increased.

The forward displacement of the left vehicle with respect to the right vehicle also has another effect on the system. This is the enlargement of the angle between the rigid mounting member 202 and the transverse linking member 180. The result of this angle enlargement is, of course, to move the piston 282 forward within the cylinder 280 of the master piston and cylinder subassembly 266. Hydraulic fluid is forced from the forward end of the fluid chamber 288 into the branch conduit 392 and, like fluid forced from the rear portion of the fluid chamber 270 in the master piston and cylinder subassembly 264, passes into the forward and rear portions of the fluid chambers 498 and 508, respectively, so that the throttle lever 514 is retarded (pivoted rearwardly) and the throttle lever 516 is advanced (pivoted forwardly).

It will be perceived that as the piston 500 is moved rearwardly in the fluid chamber 498 in the cylinder 494 of the slave piston and cylinder subassembly 490, hydraulic fluid is forced through the conduit 382 and is passed through the branch conduit 384 to the forward end of the fluid chamber 270. Thus, displacement of the piston 272 toward the rear within this chamber enlarges the volume forward of the piston and within the chamber, and this enlarged volume is then filled with hydraulic fluid entering the chamber from the conduit 384. Hydraulic fluid in the conduit 382 is also free to pass through the branch conduit 386 into the rear portion of the fluid chamber 288 located within the cylinder 280 of the master piston and cylinder subassembly 266. Also, hydraulic fluid which is driven from the forward portion of the fluid chamber 508 in the cylinder 504 can pass through the conduit 382 to either the rear portion of the fluid chamber 288 (via the branch conduit 386), or into the forward portion of the fluid chamber 270 (via the branch conduit 384).

If the left vehicle should initiate a turning movement to the left from the forward heading heretofore assumed, the angle formed between the mounting member 192 and the transverse linking member 180 will grow smaller. Therefore, the piston rod 274 will be driven rearwardly in the cylinder 268, and the piston 272 will move rearwardly in the fluid chamber 270. The hydraulic fluid forced from the rear end of the fluid chamber 270 can pass through the hydraulic conduit 390 to the conduit 388 and from this conduit, the fluid may enter the upper end of the fluid chamber 498 within the cylinder 494, and the lower end of the fluid chamber 508 within the cylinder 504. In this way, it will be apparent from what has previously been described that the speed of the left vehicle will be slowed, and the speed of the right vehicle will be increased. It will also be apparent from what has previously been said, that the enlargement of the volume of those portions of the fluid chambers 270 and 288 which are (in terms of their movement within their respective cylinders) behind the pistons 272 and 282, respectively, will be compensated by the introduction of hydraulic fluid into these portions of these chambers from the conduit 382 and branch conduits 384 and 386 as the pistons 500 and 510 move rearwardly and forwardly, respectively, within the cylinders 494 and 504, respectively.

Exactly the reverse of the described action occurs in the eventuality of either the right vehicle or the left vehicle initiating a turn toward the right. It will, of course, be recalled that in all such turning movements, the vehicle which initiates the turn is followed exactly in such turning movement by the other vehicle, since the steering systems of the vehicles are interconnected for concurrent steerage from a single vehicle. It will be noted that the travel of the manual interlink spring bias controls utilized in FIG. 9, including the travel of the piston rods 550 and 524, must be sufficiently greater than the travel of the piston rods 502 and 512 that a firm, limiting setting of the throttle levers 514 and 516 at either the maximum speed or the stop position can be realized as a result of the bias exerted by the springs 530 and 552.

If an operator on, say, the right vehicle wishes to start or increase the speed of the vehicle array, then the operator initially moves the manual control lever 564 forward, thereby moving the piston rod 550 forward. This moves the spring posts 546 and 548 forward so that a resilient bias in a forward direction is applied to the stud 554, and through it to the piston rod 512. The forward movement of the piston rod 550 causes the piston 562 to move forward in the fluid chamber 560, thus forcing hydraulic fluid out of this chamber into the hydraulic fluid conduit 570. From this conduit, the hydraulic fluid moves into the rear end portion of the fluid chamber 538 in the cylinder 534, thus driving the piston 540 forward to move the piston rod 524 forward and, under the bias of the spring 530, to move the piston rod 502 forward. This will pivot the throttle lever 514 in a forward direction.

It will be seen that the result of pivoting the manual control lever 564 forwardly by the operator on the right vehicle is to move both the throttle levers 514 and 516 forward by a substantially equal amount, thus causing the vehicles to move forwardly at the same speed (assuming that the resilient properties and mode of connection of the springs 530 and 552 are substantially identical). Since the hydraulic cylinders 494 and 504 are cross-connected by the conduits 382 and 388, the pistons 500 and 510 which are located in these respective cylinders can easily move forward to accommodate the net forward change in the spring bias position effected by forward pivotation of the manual control lever 564, with any displacement of hydraulic fluid from the forward portion of the chambers 498 and 508 in these cylinders simply resulting in a transfer of such hydraulic fluid to the rear portion of the corresponding and opposite chamber in the other of the two cylinders. The same is true of the cross-connection between the cylinders 534 and 556. Here, as the manual interlink control lever 564 is moved forwardly, any hydraulic fluid displaced from the forward portion of the fluid chamber 560 enters the rear portion of the fluid chamber 538 in the cylinder 534, and fluid displaced from the forward portion of the latter fluid chamber passes through the conduit 572 into the rear portion of the fluid chamber 560 to fill the space behind the piston 562 as this piston is moved forwardly.

As has been indicated, in the first instant after initiating a turn when the vehicle array is underway in a straight line, both vehicles have their course altered by an identical amount from the forward heading due to direct linkage of the front steering wheels of the vehicles. The effect at this time is that the vehicle on the inside of the turn will be actually displaced longitudinally with respect to the other vehicle when their instantaneous headings are considered. The longitudinal position control system of the invention will therefore act to speed up the vehicle on the outside of the turn, and slow the vehicle on the inside of the turn. During the turn, the vehicle which is nearest the center of the turning arc shall describe a sharper arc than the vehicle farthest from the center of the turning arc, and will therefore tend to precede the latter vehicle and to assume a heading which is away from the heading of the vehicle on the outside of the turn. Both of these conditions will result in the slowing of the vehicle nearest to the center of the turning arc, and the speeding up of the vehicle more distant from the center of the turning arc. As the vehicles return to straight line travel, the control system will return to a neutral position. The increase in the speed of any of the vehicles interconnected by the system of the present invention is, of course, dependent upon that particular vehicle not operating at maximum speed prior to the actuation of the longitudinal position control system.

Figure 10:
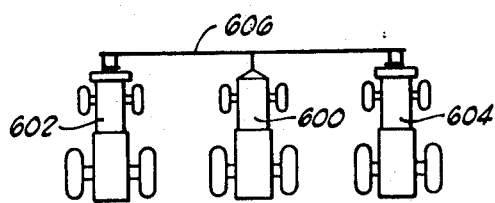
FIG. 10 is a schematic plan view of three tractor vehicles being concurrently moved abreast in a forward direction utilizing the control system of the present invention.

In FIG. 10 of the drawings there are illustrated three vehicles which are interconnected by the control system of the present invention for concurrent control to maintain the vehicles abreast of each other. As shown in this figure, a slave vehicle 600 is positioned intermediate a left vehicle 602 and a right vehicle 604. Thus, an operator controlling vehicles 602 and 604 from a position on either of these vehicles shall also control the vehicle 600. This illustrates the usage of the invention for controlling the placement of a plurality of slave vehicles intermediate or between two vehicles located on opposite sides of the slave vehicles, and interconnected by the control system of the vehicle. A simple rigid attachment of the type shown in FIG. 10 is sufficient to cause movement of the slave vehicles intermediate the two outside control vehicles, provided only that the steering systems of the several vehicles are interconnected in the manner which has been described.

Although certain preferred embodiments of the invention have been herein described, and their mode of operation discussed, it is to be understood that numerous structural changes and modifications in assemblies and subassemblies of the several embodiments can be effected without departure from the basic principles of the invention. For example, the rigid, forwardly projecting mounting members, rigid mounting arms, transverse linking members, and master piston and cylinder subassemblies, while being illustrated in the drawings and herein described as being mounted on the forward portions of the tractor vehicles being steered, could also be mounted to the rear of the vehicles, their location and orientation being primarily of importance in relation to the course traveled by the vehicles on which they are carried. Changes of this type are therefore deemed to be circumscribed by the spirit and scope of the invention.

What is claimed is:

1. A system for maintaining a plurality of laterally spaced self-propelled vehicles abreast during movement comprising:
   means for interconnecting wheels of the several vehicles for concurrently steering the vehicles; and
   a closed hydraulic-mechanical system for controlling the speeds of the vehicles to maintain horizontal alignment of the vehicles abreast of each other, said hydraulic system comprising:
      an elongated transverse linking member adapted to be extended normal to the direction of travel of the vehicles;
      mounting means connectable to each vehicle for extending therefrom in a direction coincident with or parallel to the direction of travel of the respective vehicle to which the mounting means is connected when such respective vehicle travels in a straight line, said mounting means being pivotally connected to said transverse linking member at spaced points therealong from each other corresponding to the transverse spacing of the vehicles to be maintained abreast;
      master piston and cylinder subassemblies corresponding in number to the number of vehicles being maintained abreast for association of each with a different one of said vehicles, each of said master piston and cylinder subassemblies being connected between one of said mounting means and said transverse linking member, said master piston and cylinder subassemblies each comprising:
      a cylinder having a rear end pivotally connected to said mounting means and a forward end;
      a piston reciprocably mounted in said cylinder between the rear and forward ends thereof; and
      a piston rod connected to said piston and having an end portion projecting from the forward end of said cylinder and pivotally connected to said transverse linking member at a point spaced from the point of pivotal connection thereto of the respective mounting means to which said cylinder is pivotally connected whereby as the angle between said mounting means and transverse linking member is varied, the piston rod of said subassembly is reciprocated in said cylinder;
      slave piston and cylinder subassemblies corresponding in number to the number of vehicles being maintained abreast and each mountable on a different one of said vehicles, each of said slave piston and cylinder subassemblies comprising:
      a cylinder having a rear end and a forward end;
      a piston reciprocably mounted in said slave subassembly cylinder; and
      a piston rod connected to the piston in the cylinder of said slave piston and cylinder subassembly and having a portion projecting from one end of said cylinder and connectable to a speed control device on the vehicle on which the respective slave piston and cylinder subassembly is mounted for increasing or decreasing the speed of said respective vehicle when said last mentioned piston rod is extended from, or retracted into, its respective cylinder; and
   a hydraulic fluid conduit system establishing constant fluid communication between the forward end of each master subassembly cylinder and the rear ends of the cylinders of the remaining master piston and cylinder subassemblies, and concurrently establishing fluid communication between the forward end of each master subassembly cylinder mounted on each one of said vehicles and the rear end of the cylinder of the slave piston and cylinder subassembly mounted on that same one vehicle, as well as with the front ends of the cylinders in the slave piston and cylinder subassemblies mounted on the remainder of said vehicles other than said one vehicle, and concurrently establishing fluid communication between the rear end of the cylinder in each slave piston and cylinder subassembly and the forward end of the cylinder of the master piston and cylinder subassembly mounted on the same vehicle as the respective slave subassembly, as well as with the rear end of the cylinder in each of the master piston and cylinder subassemblies mounted on the remainder of said vehicles, said hydraulic fluid conduit system forming with the cylinders of said master piston and cylinder subassemblies and said slave piston and cylinder subassemblies, a closed hydraulic circuit.

2. A system as defined in claim 1 and further characterized to include a variable interlink speed control means connected to the piston rod of each slave piston and cylinder subassembly for connecting this piston rod to its respective speed control device.

3. A system as defined in claim 1 and further characterized to include means for constantly supplying hydraulic fluid to said fluid conduit system.

4. A system as defined in claim 1 wherein the piston rods of each of said piston and cylinder subassemblies extend through walls on opposite sides of the cylinder in which the respective pistons to which the piston rods are connected are located.

5. A system as defined in claim 1 wherein said means interconnecting the wheels of the several vehicles comprises:
   steering links connectable to at least one wheel on each of said vehicles; and
   a connecting link pivotally interconnecting said steering links.

6. A system as defined in claim 1 wherein said transverse linking member includes telescoped portions facilitating longitudinal telescoping of said linking member.

7. A system as defined in claim 1 wherein said means interconnecting said wheels comprises:
   a mounting frame adapted for securement to the forward end of each of said vehicles for movement therewith;
   a mounting fixture reciprocably mounted on each of said mounting frames and secured to said mounting means; and
   linkage means for interconnecting each of said mounting fixtures with the wheels of the respective vehicle upon which the mounting fixture is located.

8. A system as defined in claim 1 wherein each of said mounting means comprises:
   a rigid, elongated mounting member having one end adapted for connection to the forward end of one of said vehicles for extension of the mounting member forwardly therefrom, and having a second end pivotally connected to said transverse linking member; and
   a mounting arm extending substantially normal to said mounting member and having the rear end of the cylinder of one of said master piston and cylinder subassemblies pivotally connected thereto.

9. A system as defined in claim 1 wherein said transverse linking member includes sleeves each freely rotatable about the longitudinal axis of said transverse linking member and each pivotally secured to a different one of said mounting means for pivotation of said one mounting means about a pivotal axis extending normal to said longitudinal axis whereby pitching motion of said vehicles is accommodated.

10. A system as defined in claim 2 wherein each of said variable interlink speed control means comprises:
- a sleeve connectable to a speed control lever on one of said vehicles and slidingly receiving one of the piston rods of each of said slave subassemblies; and
- means for selectively adjusting the distance which said one slave subassembly piston rod extends into said sleeve.

11. A system as defined in claim 1 and further characterized to include spring means in each of said slave piston and cylinder subassemblies, each spring means continuously biasing each of the respective pistons in each slave subassembly toward the forward end of its respective cylinder.

12. A system as defined in claim 1 and further characterized as including:
- a manual control lever operatively associated with each of said slave piston and cylinder subassemblies;
- an additional cylinder operatively associated with each of said slave piston and cylinder subassemblies and having a forward end and a rear end;
- a piston in each of said additional cylinders;
- a spring biasing piston rod connected to the piston in each of said additional cylinders and projecting from the respective additional cylinder, the projecting end of each such spring biasing piston rod being connected to the respective one of said manual control levers;
- spring means interconnecting said spring biasing piston rod and the piston rod of the one of said slave subassemblies with which the respective addtional cylinder is operatively associated for resiliently biasing the latter piston rod in the direction said spring biasing piston rod is reciprocated in its respective additional cylinder; and
- a hydraulic fluid conduit interconnecting the forward end of each of said additional cylinders with the rear end of the remaining ones of said additional cylinders.

13. A system as defined in claim 7 wherein each of said mounting means comprises:
- a rigid elongated mounting member having one end secured to one of said mounting fixtures and having a second end pivotally connected to said transverse linking member; and
- a mounting arm secured to, and extending substantially normal to, said mounting member, said mounting arm being pivotally connected to the rear end of the cylinder of one of said master piston and cylinder subassemblies.

14. A system as defined in claim 13 wherein said linkage means comprises:
- a transverse steering link connected to each respective mounting fixture for movement therewith on the respective mounting frame; and
- a main steering link having an end pivotally connected to said transverse steering link and being connectable to one of the ground wheels of one of said vehicles for turning said ground wheel in response to a reciprocating movement of said mounting fixture on said mounting frame.

15. A system as defined in claim 9 wherein each of said mounting means comprises:
- an elongated mounting member having an end pivotally connected to one of said sleeves; and
- means for pivotally mounting said mounting member of the forward end of one of said vehicles for forward, horizontal projection therefrom and pivotation about a horizontal axis.

16. A system as defined in claim 10 wherein said means for selectively adjusting the distance which said one slave subassembly extends into said sleeve comprises:
- an arcuate indexing member connected to the piston rod which rod is slidingly received in said sleeve at a point between said sleeve and the cylinder of said one slave subassembly; and
- an interlink control lever pivotally connected to said sleeve and to said arcuate indexing member, and adjustably securable to said arcuate indexing member when said sleeve is in a preselected position relative to the piston rod received therein.

17. A system as defined in claim 12 wherein each of said spring means comprises:
- a pair of spring posts projecting from said spring biasing piston rod and spaced longitudinally therealong;
- a spring connected between said spring posts; and
- a stud having one end secured to the piston rod of said one slave subassembly, and having a second end secured to an intermediate portion of said spring.

18. A system as defined in claim 2 wherein said variable interlink speed control means comprises:
- first additional cylinders each slidingly receiving the piston rod of one of said slave subassemblies and connectable to the speed control device of one of said vehicles, each of said first additional cylinders being movable freely relative to the cylinder of the slave subassembly which includes the piston rod it slidingly receives;
- a first additional piston secured to the piston rod of each slave subassembly and reciprocably mounted in the first additional cylinder receiving the respective piston rod to which it is secured;
- a second additional cylinder associated with each slave piston and cylinder subassembly;
- a second additional piston reciprocably mounted in each of said second additional cylinders;
- a piston rod secured to each of said second additional pistons and projecting from the respective second additional cylinder in which its respective second additional piston is located;
- a manual control lever secured to the projecting portion of each of the piston rods secured to said second additional pistons; and
- hydraulic fluid conduits interconnecting said first additional cylinders with said second additional cylinders to form a closed hydraulic system.

19. A system as defined in claim 1 and further characterized to include at least one additional slave piston and cylinder subassembly mountable on one of said vehicles with one of said first-mentioned slave piston and cylinder subassemblies, said additional slave piston and cylinder subassembly including a piston having a smaller surface area than the surface area of the piston of said first-mentioned slave piston and cylinder subassembly mounted on the same vehicle therewith, and further including a piston rod connectable to a second speed control device on said one vehicle which carries both slave subassemblies;
- a first hydraulic fluid conduit interconnecting the forward end of the cylinder of said additional slave piston and cylinder subassembly with the forward end of said first-mentioned slave subassembly which is mountable therewith on one of said vehicles; and
- a second hydraulic fluid conduit interconnecting the rear end of the cylinder of said additional slave piston and cylinder subassembly with the rear end of said first-mentioned piston and cylinder subassembly which is mountable therewith on one of said vehicles.

20. In combination:
- a plurality of self-propelled, horizontally spaced vehicles each having a forward end and a rear end, and each heading in substantially the same direction, said vehicles each further having at least one front wheel for guidance purposes, and having a speed control device for controlling the speed of the vehicle;
- linkage means interconnecting the front wheels of the several vehicles for causing the vehicles to turn together;
- a closed hydraulic-mechanical system for controlling the speeds of the vehicles to maintain horizontal alignment of the vehicles abreast of each other, said system comprising:

an elongated transverse linking member positioned ahead of the vehicles in the direction of their travel and extending transversely across the direction of travel of the vehicles, said transverse linking member being substantially unyielding in planes extending normal to its longitudinal axis;

rigid mounting members each having an end connected to one of said vehicles and extending forwardly from said one vehicle to said transverse linking member and pivotally connected to said transverse linking member for pivotation about a vertical axis;

a mounting arm secured to, and projecting from, each mounting member in a direction substantially normal to the front to rear axis of the vehicle to which its respective mounting member is connected;

a master piston and cylinder subassembly connected between each of said mounting arms and said transverse linking member, each of said master piston and cylinder subassemblies comprising:

- a cylinder having a rear end pivotally connected to said mounting arm and a forward end facing toward said transverse linking member;
- a piston reciprocably mounted in said cylinder between the rear end and the forward end thereof; and
- a piston rod connected to said piston and having an end portion projecting from the forward end of said cylinder and pivotally connected to said transverse linking member;

a slave piston and cylinder subassembly mounted on each of said vehicles which carry one of said rigid mounting arms, each of said slave piston and cylinder subassemblies comprising:

- a cylinder having a rear end and a forward end;
- a piston reciprocably mounted in said slave subassembly cylinder for reciprocating movement between the rear end and the forward end thereof;
- a piston rod connected to the piston in the cylinder of said slave subassembly and having a projecting portion connected to the speed control device of the vehicle on which the respective slave subassembly is mounted; and
- spring means resiliently urging the piston in said slave subassembly cylinder toward the forward end of said subassembly cylinder; and a conduit system interconnecting said cylinders and establishing fluid communication between the forward end of each one of said master subassembly cylinders and the rear ends of each cylinder in said remaining master subassemblies and with the rear end of the cylinder of the slave subassembly mounted on the same vehicle as the respective cylinder in said one master subassembly, said conduit system further interconnecting the forward end of each slave subassembly cylinder with the rear end of the respective cylinder in said one master subassembly mounted on the same vehicle therewith, and with the forward end of each of the remaining master subassembly cylinders.

References Cited

UNITED STATES PATENTS

| | | | |
|---|---|---|---|
| 1,310,604 | 7/1919 | Burgess | 180—14 |
| 3,035,653 | 5/1962 | Steepe | 180—14 |
| 3,063,512 | 11/1962 | Yadon | 180—14 |
| 3,245,488 | 4/1966 | Peterson | 180—14 |

KENNETH H. BETTS, Primary Examiner

JOHN P. SILVERSTRIM, Assistant Examiner

U.S. Cl. X.R.

137—344; 239—177; 180—79.2; 280—413, 419